(12) United States Patent
Yanovsky et al.

(10) Patent No.: US 11,182,247 B2
(45) Date of Patent: Nov. 23, 2021

(54) ENCODING AND STORAGE NODE REPAIRING METHOD FOR MINIMUM STORAGE REGENERATING CODES FOR DISTRIBUTED STORAGE SYSTEMS

(71) Applicant: CLOUD STORAGE, INC., Shenandoah, TX (US)

(72) Inventors: David Yanovsky, Tallinn (EE); Vera Dmitriyevna Miloslavskaya, Saint-Petersburg (RU)

(73) Assignee: CLOUD STORAGE, INC., Shenandoah, TX (US)

( * ) Notice: Subject to any disclaimer, the term of this patent is extended or adjusted under 35 U.S.C. 154(b) by 0 days.

(21) Appl. No.: 16/776,070

(22) Filed: Jan. 29, 2020

(65) Prior Publication Data

US 2020/0241960 A1 Jul. 30, 2020

Related U.S. Application Data

(60) Provisional application No. 62/798,265, filed on Jan. 29, 2019, provisional application No. 62/798,256, filed on Jan. 29, 2019.

(51) Int. Cl.
*G06F 11/10* (2006.01)
*G06F 3/06* (2006.01)
(Continued)

(52) U.S. Cl.
CPC ........ *G06F 11/1076* (2013.01); *G06F 3/0619* (2013.01); *G06F 3/0641* (2013.01); *G06F 3/0647* (2013.01); *G06F 3/0689* (2013.01); *G06F 7/588* (2013.01); *G06F 11/1044* (2013.01); *H03M 13/1148* (2013.01); (Continued)

(58) Field of Classification Search
CPC .. G06F 11/1076; G06F 3/0619; G06F 3/0641; G06F 3/0647; G06F 3/0689; G06F 7/588; G06F 11/1044; H03M 13/1148; H03M 13/1515; H03M 13/154; H03M 13/6312; H04L 9/0643
See application file for complete search history.

(56) References Cited

U.S. PATENT DOCUMENTS 6,665,308 B1 12/2003 Rakib
6,952,737 B1 10/2005 Coates et al.
(Continued)

FOREIGN PATENT DOCUMENTS

CN 105335150 2/2016
WO WO 2014/005279 1/2014
(Continued)

OTHER PUBLICATIONS

Dimakis, A.G., et al., "Network coding for Distributed Storage Systems," IEEE Transactions of Information Theory, vol. 56, No. 9, Sep. 2010, pp. 4539-4551.
(Continued)

*Primary Examiner* — Kyle Vallecillo
(74) *Attorney, Agent, or Firm* — Leason Ellis LLP

(57) ABSTRACT

The present disclosure is based on erasure coding, information dispersal, secret sharing and ramp schemes to assure reliability and security. More precisely, the present disclosure combines ramp threshold secret sharing and systematic erasure coding.

17 Claims, 14 Drawing Sheets

(51) Int. Cl.
*G06F 7/58* (2006.01)
*H03M 13/15* (2006.01)
*H04L 9/06* (2006.01)
*H03M 13/11* (2006.01)
*H03M 13/00* (2006.01)

(52) U.S. Cl.
CPC ..... *H03M 13/154* (2013.01); *H03M 13/1515* (2013.01); *H03M 13/6312* (2013.01); *H04L 9/0643* (2013.01)

(56) References Cited

U.S. PATENT DOCUMENTS

| | | |
|---|---|---|
| 7,010,532 B1 | 3/2006 | Stakutis et al. |
| 8,296,812 B1 | 10/2012 | Ganesan |
| 8,332,375 B2 | 12/2012 | Chatley |
| 8,442,989 B2 | 5/2013 | Massoulie et al. |
| 8,560,801 B1 * | 10/2013 | Pendharkar ............. G06F 3/061 711/170 |
| 8,576,852 B2 | 11/2013 | Arisoylu et al. |
| 8,621,318 B1 | 12/2013 | Micheloni et al. |
| 8,717,885 B2 | 5/2014 | Arisoylu et al. |
| 8,924,359 B1 * | 12/2014 | Pendharkar ............. G06F 3/061 707/665 |
| 8,935,493 B1 | 1/2015 | Dolan |
| 9,104,691 B2 | 8/2015 | Resch et al. |
| 9,201,835 B2 | 12/2015 | Akin et al. |
| 9,741,005 B1 | 8/2017 | Adogla |
| 9,864,550 B2 | 1/2018 | Song et al. |
| 9,916,198 B2 | 3/2018 | Baker et al. |
| 10,216,740 B2 | 2/2019 | Neporada et al. |
| 10,608,784 B2 | 3/2020 | Yanovsky et al. |
| 10,735,137 B2 * | 8/2020 | Yanovsky ........... G06F 11/1088 |
| 2001/0001616 A1 | 5/2001 | Rakib |
| 2002/0133491 A1 | 9/2002 | Sim |
| 2003/0074486 A1 | 4/2003 | Anastasiadis |
| 2005/0216813 A1 | 9/2005 | Cutts |
| 2007/0005795 A1 | 1/2007 | Gonzalez |
| 2007/0008847 A1 | 1/2007 | Maruyama |
| 2007/0079083 A1 | 4/2007 | Gladwin et al. |
| 2008/0046104 A1 | 2/2008 | Van Camp et al. |
| 2009/0199274 A1 | 8/2009 | Frazier et al. |
| 2009/0228763 A1 | 9/2009 | Wang |
| 2010/0094957 A1 | 4/2010 | Zuckerman et al. |
| 2010/0218037 A1 | 8/2010 | Swartz et al. |
| 2010/0250497 A1 | 9/2010 | Redlich et al. |
| 2011/0072115 A1 | 3/2011 | Gladwin et al. |
| 2011/0106972 A1 | 5/2011 | Grube et al. |
| 2011/0161666 A1 | 6/2011 | Gladwin et al. |
| 2011/0219100 A1 | 9/2011 | Dhuse et al. |
| 2012/0060072 A1 | 3/2012 | Simitci et al. |
| 2013/0111166 A1 | 5/2013 | Resch et al. |
| 2013/0117560 A1 | 5/2013 | Resch |
| 2014/0136571 A1 | 5/2014 | Bonvin |
| 2014/0237614 A1 * | 8/2014 | Irvine ................... H04L 9/3247 726/26 |
| 2014/0278807 A1 | 9/2014 | Bohacek |
| 2014/0351624 A1 | 11/2014 | Resch |
| 2014/0380114 A1 | 12/2014 | Alexeev et al. |
| 2015/0067819 A1 | 3/2015 | Shribman |
| 2015/0256617 A1 | 9/2015 | Klose |
| 2016/0072891 A1 | 3/2016 | Joshi |
| 2017/0063397 A1 | 3/2017 | Richardson et al. |
| 2017/0272100 A1 | 9/2017 | Yanovsky et al. |
| 2017/0272209 A1 * | 9/2017 | Yanovsky ........... H04L 67/1097 |
| 2017/0286223 A1 | 10/2017 | Baptist |
| 2018/0018261 A1 | 1/2018 | Vekiarides et al. |
| 2018/0018285 A9 | 1/2018 | Volvovski et al. |
| 2018/0218073 A1 | 8/2018 | Wilshinsky et al. |
| 2019/0036648 A1 | 1/2019 | Yanovsky et al. |
| 2019/0182115 A1 | 6/2019 | Wilshinsky et al. |
| 2019/0340379 A1 * | 11/2019 | Beecham ............ G06F 16/9014 |
| 2019/0356416 A1 | 11/2019 | Yanovsky et al. |

FOREIGN PATENT DOCUMENTS

| | | |
|---|---|---|
| WO | WO 2014/0102565 | 7/2014 |
| WO | WO 2015/057240 | 4/2015 |
| WO | WO 2015/0175411 | 11/2015 |
| WO | WO 2017/161050 | 9/2017 |

OTHER PUBLICATIONS

Rabin, M.O., "Efficient Dispersal of Information for Security, Load Balancing, and Fault Tolerance," Journal of the Association for Computing Machinery, vol. 36, No. 2, Apr. 1989, pp. 335-348.

Arikan, E., "Channel Polarization: A Method for Constructing Capacity-Achieving Codes for Symmetric Binary-Input Memory-less Channels," IEEE Transactions on Information Theory, vol. 55, No. 7, Jul. 2009, pp. 3051-3073.

Zyablov, V. et al., "An Introduction to Generalized Concatenated Codes," European Transactions on Telecommunications, vol. 10, No. 6, Nov.-Dec. 1999, pp. 609-622.

Miloslavskaya V., Trifonov P. "Design of polar codes with arbitrary kernels" Proceedings of IEEE Information Theory Workshop. Sep. 3-7, 2012. pp. 119-123.

Miloslavskaya V., Trifonov P. "Sequential Decoding of Reed-Solomon Codes" Proceedings of International Symposium on Information Theory and Applications. Oct. 26-29, 2014. pp. 424-428.

Blokh, E.L., et al., Math-Net.Ru—All Russian mathematical portal, "Coding of Generalized Concatenated Codes," Problems of Information Transmission, 1974, vol. 10, No. 3, http://www.mathnet.ru/eng/agreement, pp. 218-222.

Rizzo, L. (Apr. 1997). "Effective erasure codes for reliable computer communication protocols". ACM SIGCOM:M computer communication review, 27(2), 24-36.Retrieved from the internet on Aug. 31, 2015 <http://ccr.sigcomm.org/archive/1997/apr97/ccr-9704-rizzo.pdf> Rizzo, L. Dec. 31, 1997 (Dec. 31, 1997) Whole document.

Li, Mingqiang, "On the Confidentiality of Information Dispersal Algorithms and Their Erasure Codes", Mar. 13, 2013, The Chinese University of Hong Kong, pp. 1-4.

* cited by examiner

ENCODING AND STORAGE NODE REPAIRING METHOD FOR MINIMUM STORAGE REGENERATING CODES FOR DISTRIBUTED STORAGE SYSTEMS

CROSS-REFERENCE TO RELATED PATENT APPLICATIONS

This application is based on and claims priority to U.S. Provisional Patent Application No. 62/798,265, filed Jan. 29, 2019 and this application is based on and claims priority to U.S. Provisional Patent Application No. 62/798,256, filed Jan. 29, 2019, all of which are incorporated by reference, as if expressly set forth in their respective entireties herein.

BACKGROUND

Distributed storage systems play an important role in management of big data, particularly for data generated at tremendous speed. A distributed storage system may require many hardware devices, which often results in component failures that will require recovery operations. Moreover, components in a distributed storage system may become unavailable, such as due to poor network connectivity or performance, without necessarily completely failing. Data loss can occur during standard IT procedures such as migration, or through malicious attacks via ransomware or other malware. Ransomware is a type of malicious software from cryptovirology that threatens to publish the victim's data or perpetually block access to it unless a ransom is paid. An advanced malware uses a technique called cryptoviral extortion, in which it encrypts the victim's files, making them inaccessible, and demands a ransom payment to decrypt them. Therefore, in view that any individual storage node may become unreliable, redundancy measures are often introduced to protect data against storage node failures and outages, or other impediments. Such measures can include distributing data with redundancy over a set of independent storage nodes.

One relatively simple data protection technique is replication. Replication, particularly triple replication, is often used in distributed storage systems to provide fast access to data. Triple replication, however, can suffer from very low storage efficiency which, as used herein, generally refers to a ratio of an amount of original data to an amount of actually stored data, i.e., data with redundancy. Error-correcting coding, and more particularly erasure coding, provides an opportunity to store data with relatively high storage efficiency, while simultaneously maintaining an acceptable level of tolerance against storage node failure. Thus, relatively high storage efficiency can be achieved by maximum distance separable (MDS) codes, such as, but not limited to, Reed-Solomon codes. Long MDS codes, however, can incur prohibitively high repair costs. In case of employing locally decodable codes, any single storage node failure can be recovered by accessing a pre-defined number of storage nodes and by performing corresponding computations. Locally decodable codes (LDC) are designed to minimize I/O overhead. In the case of cloud storage systems, minimization of I/O overhead is especially desirable because data transmission can consume many resources, while computational complexity is less significant. In spite of promising theoretical results, the number of practical constructions of LDC codes is low.

Another important requirement is related to bandwidth optimization, which leads to reduced latency. A class of regenerating codes was particularly proposed to provide efficient repair of failed storage nodes in distributed storage systems. There are two special sub-classes of regenerating codes: minimum-storage regenerating (MSR) and minimum-bandwidth regenerating (MBR). In case of MSR codes, storage efficiency is the same as in case of Reed-Solomon codes, but repair bandwidth is at lowest bound. In case of MBR codes, storage efficiency is sacrificed to enable further reduction of repair bandwidth.

Another consideration of cloud storage systems is a security requirement. In such systems, security may consist of data encryption, however, although the computation complexity of data encryption is high and maintaining keys continues to be an operational issue. Alternative approaches can include such mixing original data and dispersal among different locations, that any amount of original data can be reconstructed only by accessing not less than a pre-defined number of storage nodes. This pre-defined number of storage nodes is such that probability that a malicious adversary is able to access all these nodes is negligible.

SUMMARY

In one or more implementations, a system and method are provided for distributing data of a plurality of files over a plurality of respective remote storage nodes, the method comprising:
   a. splitting into segments, by at least one processor configured to execute code stored in non-transitory processor readable media, the data of the plurality of files;
   b. preprocessing each segment and then splitting it into v of input chunks: t highly sensitive chunks and v–t frequently demanded chunks, where highly sensitive chunks contain data which ought to be stored securely and highly demanded chunks contain data which ought to be stored in highly-available manner;
   c. encoding, by the at least one processor, v input chunks (produced from the same segment) together with k–v supplementary input chunks into n of output chunks, where any of n output chunks do not contain copy of any fragment of highly sensitive chunks, while v–t output chunks are given by copies of v–t frequently demanded input chunks (these output chunks are further referred as frequently demanded output chunks), n≥k;
   d. assigning, by the at least one processor, output chunks to remote storage nodes, wherein n output chunks produced from the same segment are assigned to n different storage nodes
   e. transmitting, by the at least one processor, each of the output chunks to at least one respective storage node; and
   f. retrieving, by the at least one processor, at least a part of at least one of the plurality of files by downloading parts of output chunks from storage nodes, where amount of data transferred from each storage node is optimized to minimize average latency for data reconstruction.

In a further aspect of the system and method, wherein the step of data splitting provides data within a respective segment that comprises a part of one individual file or several different files.

In a further aspect of the system and method, wherein the step of segment preprocessing comprises one or several of the following transformations: deduplication, compression, encryption and fragmentation.

In a further aspect of the system and method, wherein the step of segment preprocessing includes encryption, wherein one or several parts of a segment are encrypted in individual manner or a segment is encrypted entirely.

In a further aspect of the system and method, wherein the step of segment preprocessing includes fragmentation consisting of data partitioning and encoding, wherein fragmentation encoding is a function of one or several of the following: random (pseudo-random) values, values derived from original data (e.g. derived using deterministic cryptographic hash) and predetermined values.

In a further aspect of the system and method, wherein the step of encoding employs supplementary inputs given by random data, values derived from original data (e.g. derived using deterministic hash) or predetermined values.

In a further aspect of the system and method, wherein the step of encoding comprises applying erasure coding to k input chunks to produce n output chunks, where erasure coding is performed using a linear block error correction code in such a way that t highly sensitive input chunks may be reconstructed only as a function of at least k output chunks (any k output chunks are suitable), while (v−t) frequently demanded input chunks may be reconstructed as a copy of a related output chunks, as well as a function of any other k input chunks.

In a further aspect of the system and method, wherein method for erasure coding utilizes a maximum distance separable (MDS) error-correction code and encoding is performed using k×n generator matrix G comprising (k−p) columns of k×k identity matrix, where $0 \leq t \leq p \leq k$ and $v-t \leq k-p$, while other columns form k×(n+p−k) matrix such that any its square submatrix is nonsingular.

In a further aspect of the system and method, wherein a k×n MDS code generator matrix G is obtained as follows
  a. Selecting an arbitrary MDS code of length (n+p) and dimension k;
  b. Constructing a k×(n+p) generator matrix in systematic form (i.e. generator matrix, which includes k×k identity matrix as its submatrix);
  c. Excluding p columns of k×k identity matrix from k×(n+p) generator matrix in systematic form to obtain k×n matrix G.

In a further aspect of the system and method, wherein t=v, that is output chunks do not contain any copy of a fragment of input chunks produced from a segment and any fragment of a these input chunks may be reconstructed only as a function of at least k output chunks.

In a further aspect of the system and method, wherein employed MDS error-correction code is a Reed-Solomon code.

In a further aspect of the system and method, wherein for encoding with Reed-Solomon code employed generator matrix is based on Vandermonde matrix.

In a further aspect of the system and method, wherein for encoding with Reed-Solomon code employed generator matrix is based on Cauchy matrix concatenated with identity matrix.

In a further aspect of the system and method, wherein the step of assigning of output chunks to storage nodes comprises selection of trusted storage nodes (e.g. in private storage) and mapping frequently demanded output chunks to these trusted storage nodes.

In a further aspect of the system and method, wherein the step of assigning of output chunks to storage nodes comprises selection of highly available storage nodes, mapping frequently demanded output chunks to these storage nodes and encrypting frequently demanded output chunks in individual manner prior to transmission, where highly available storage nodes demonstrate high average data transferring speed and low latency.

In a further aspect of the system and method, wherein the step of data (at least a part of at least one of the plurality of files) retrieving comprises
  a. identifying range of indices within each information chunk corresponding to requested data;
  b. downloading, by the at least one processor, such parts of output chunks from storage nodes that
    i. total size these parts is equal to the size of the widest range multiplied by k and
    ii. the number of parts with the same range of indices within output chunks is equal to k;
  c. reconstructing, by the at least one processor, requested data by performing the following steps:
    for each set S of k source storage nodes
      i. combing parts with the same range of indices into a vector $c_s$, and
      ii. multiplying vector $c_s$ by inverse matrix to matrix $G^{(S)}$, where $G^{(S)}$ is a matrix consisting of k columns of selectively mixing matrix G with indices from the set S.

In a further aspect of the system and method, wherein requested data is contained only in frequently demanded input chunks. In this case, requested data may be retrieved by downloading only corresponding frequently demanded output chunks. Thus, traffic reduction is achieved compared to general case of data retrieval.

In one or more implementations, a system and method are provided for distributing data of a plurality of files over a plurality of respective remote storage nodes, the method comprising:
  a. splitting data into segments, by at least one processor configured to execute code stored in non-transitory processor readable media, the data of the plurality of files;
  b. optionally applying deduplication, compression and/or encryption to each segment;
  c. splitting each segment into k information multi-chunks and optionally applying data mixing to these information chunks to produce k systematic multi-chunks;
  d. encoding, by the at least one processor, k systematic multi-chunks (produced from the same segment) into r parity multi-chunks, wherein employed erasure coding scheme maximizes storage efficiency, enables reconstruction of the k systematic multi-chunks from any k output multi-chunks and enables recovering of a single output multi-chunk with minimized network traffic, where the set of k+r output multi-chunks comprises k systematic multi-chunks and r parity multi-chunks;
  e. assigning, by the at least one processor, k+r output multi-chunks to remote storage nodes, wherein k+r output multi-chunks produced from the same segment are assigned to k+r different storage nodes;
  f. transmitting, by the at least one processor, each of the output multi-chunks to at least one respective storage node;
  g. storage node repairing, by the at least one processor, wherein at least one output multi-chunk is recovered as a function of parts of other output multi-chunks produced from the same segment, wherein network traffic is minimized; and
  h. retrieving, by the at least one processor, at least a part of at least one of the plurality of files as a function of parts of output multi-chunks.

In a further aspect of the system and method, wherein the storage node repairing step is such that
  a. Recovering of the i-th parity multi-chunk requires accessing 1/r portion of each of other k+r−1 output multi-chunk produced from the same segment. Repair bandwidth for i-th parity multi-chunk is equal to (k+r−1)/r.
  b. Recovering of the i-th systematic multi-chunk requires accessing 1/r portion of each of other k+r−1 output multi-chunk produced from the same segment in case sufficiently high value of parameter $\alpha$, otherwise Ti supplementary sub-chunks are also accessed. Repair bandwidth for i-th systematic multi-chunk is equal to $(k+r-1)/r+\tau_i/\alpha$.

In a further aspect of the system and method, wherein the step of data retrieval comprising transferring from storage nodes any k out of k+r output multi-chunks produced from the same segment and reconstruction of the corresponding data segment as a function of these output multi-chunks.

In a further aspect of the system and method, wherein the step of encoding comprises
  a. Representing k systematic multi-chunks as k columns of a table, distinguishing $\alpha$ rows in the table and further distinguishing r sub-rows in each row, where an element in a row/column intersection is referred as chunk and an element in a sub-row/column intersection is referred as sub-chunk;
  b. Stage 1 of erasure coding, wherein k multi-chunks are encoded into r intermediate parity multi-chunks and the following conditions are satisfied
    i. k systematic multi-chunks may be reconstructed from any k out of k+r systematic and intermediate parity multi-chunks (MDS requirement);
    ii. Any systematic multi-chunk may be reconstructed with repair bandwidth $(k+r-1)/r+\tau_i/\alpha$, wherein 1/r portion of each of other k+r−1 multi-chunk is transferred from storage nodes together with $\tau_i$ supplementary sub-chunks, and wherein either all or none intermediate parity sub-chunks in a sub-row are required.
  c. Stage 2 of erasure coding, wherein r intermediate parity multi-chunks are encoded into r parity multi-chunks and the following conditions are satisfied
    i. k systematic multi-chunks may be reconstructed from any k out of (k+r) systematic and parity multi-chunks, that is replacement of r intermediate parity multi-chunks by r parity multi-chunks does not affect compliance with the MDS requirement;
    ii. Any parity multi-chunk may be recovered with repair bandwidth (k+r−1)/r, wherein 1/r portion of each of other k+r−1 multi-chunk is transferred from storage nodes.

In a further aspect of the system and method, wherein encoder for the stage 1 of erasure coding is such that
  a. Encoding is individually performed for each input a×k sub-table consisting of $\alpha$ rows and k systematic columns, wherein an element of the sub-table may be represented by a single symbol or a sequence of symbols, e.g. chunk or sub-chunk;
  b. The encoder is specified by a×r expressions, where each expression is intended for computation of a particular intermediate parity element as a linear combination of systematic elements, wherein presence of a systematic element with non-zero coefficient in expression for an intermediate parity element is denoted as reference between these elements;
  c. Each systematic element has at most one inter-row reference, wherein systematic elements with inter-row references are referred as highly-connected and systematic elements without inter-row references are referred as low-connected;
  d. Each intermediate parity element has none, $\lfloor k/r \rfloor$ or $\lceil k/r \rceil$ references;
  e. Each systematic column has $\alpha/r$ low-connected elements. A set of row-indices of $\alpha/r$ low-connected elements from the i-th systematic column is referred as repair set $W^{(i)}$, $1 \leq i \leq k$;
  f. Each systematic column has a−a/r highly connected elements;
  g. References of $\alpha-\alpha/r$ highly connected elements of i-th systematic column point to $\alpha-\alpha/r$ different intermediate parity elements belonging to rows from repair set $W^{(i)}$ and the smallest possible number $\tau_i$ of elements from other rows, $1 \leq i \leq k$;
  h. Each row has $\lfloor k/r \rfloor$ or $\lceil k/r \rceil$ low-connected element.

In a further aspect of the system and method, wherein encoder for the stage 2 of erasure coding is such that
  a. Encoding is individually performed over each r×r sub-table consisting of r sub-rows of a fixed row and r parity columns, wherein an element of the sub-table may be represented by a single symbol or a sequence of symbols, e.g. sub-chunk;
  b. Each parity element located in sub-row i and column C is given by
    i. an intermediate parity element located in sub-row i and column C, or
    ii. linear combination of two intermediate parity elements, one of which is located in sub-row i and column C and another one belongs to sub-row R and column j, where sub-row R is related to column C and j-th element of sub-row R is connected with i-th element of column C.
  c. Each sub-row contains one parity element equal to intermediate parity element from the same sub-row and column;
  d. Each parity column contains one parity element equal to intermediate element from the same sub-row and column;
  e. Intermediate parity elements may be recovered from parity elements.

In a further aspect of the system and method, wherein the step of optional data mixing is such that erasure coding integrated with data mixing ensures that any piece of data segment may be reconstructed only from pieces of at least k output multi-chunks produced from the same segment.

In a further aspect of the system and method, wherein the step of data mixing comprises
  a. multiplication of a data segment by such k×k matrix M that its inverse matrix is non-singular, where the multiplication results in a number of output vectors of length k; and
  b. mapping the symbols of output vectors to k systematic multi-chunks in such a way that k symbols of each output vector are assigned to k different systematic multi-chunks and indices of these symbols within sub-chunks of multi-chunks are different.

These and other aspects, features, and advantages can be appreciated from the accompanying description of certain embodiments of the disclosure and the accompanying drawing figures and claims.

DETAILED DESCRIPTION OF THE EMBODIMENTS

Figure 1:
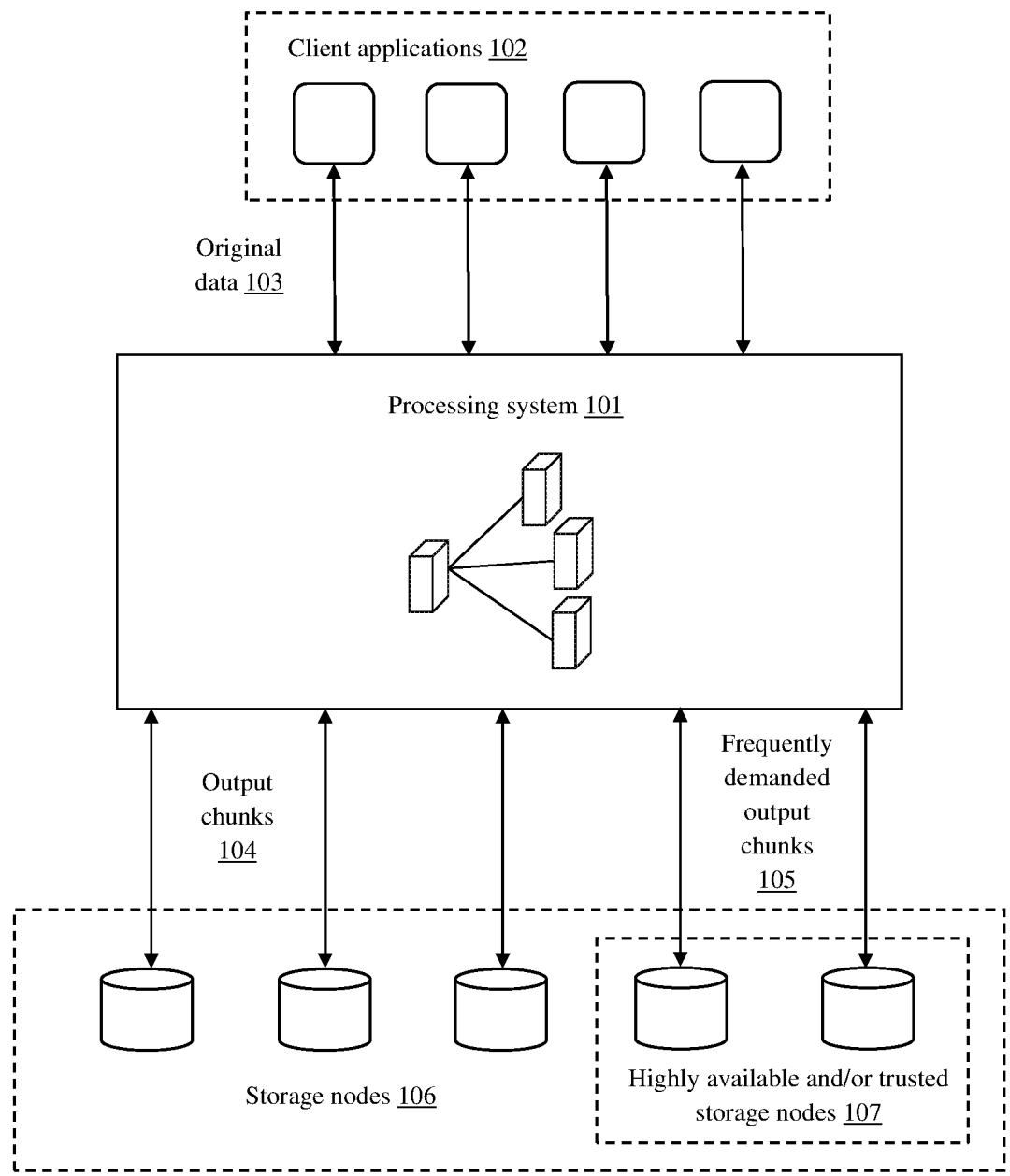
FIG. 1 is a schematic block diagram illustrating a distributed storage system interacting with client applications.

The present disclosure is intended to provide reliability, security and integrity for a distributed storage system. The present disclosure is based on erasure coding, information dispersal, secret sharing and ramp schemes to assure reliability and security. More precisely, the present disclosure combines ramp threshold secret sharing and systematic erasure coding. Reliability (the number of tolerated storage node failures) depends on parameters of erasure coding scheme. Security is achieved by means of information dispersal among different storage nodes. Here storage nodes can be both public and/or private. Higher security levels are achieved by introducing supplementary inputs into erasure coding scheme, which results in ramp threshold scheme. Increase in amount of supplementary inputs leads to increase in security level. Computational security may be further improved by applying optional encryption and/or fragmentation. There is no need to trust neither cloud service providers no network data transfers. As for data integrity, in order to verify the honesty of cloud service providers and the correctness of stored data chunks two types of hash-based signatures are incorporated.

Secret sharing is a particularly interesting cryptographic technique. Its most advanced variants indeed simultaneously enforce data privacy, availability and integrity, while allowing computation on encrypted data. A secret sharing scheme transforms sensitive data, called secret, into individually meaningless data pieces, called shares, and a dealer distributes shares to parties such that only authorized subsets of parties can reconstruct the secret. In case of classical secret sharing, e.g. Shamir's scheme, the size of each share is equal to the size of secret. Thus, applying secret sharing leads to n-times increase in data volume, where n is the number of participants.

In case of a distributed storage system, participants are represented by storage nodes. A storage node is typically a datacenter, a physical server with one or more hard-disk drives (HDDs) or solid-state drives (SSDs), an individual HDD or SSD. A storage node may be a part of a private storage system or belong to a cloud service provider (CSP).

Storage nodes are individually unreliable. Applying erasure coding, information dispersal, secret sharing or ramp scheme enables data reconstruction is case of storage node failures or outages. Here data (secret) may be represented by original client's data or generated metadata, e.g. encryption keys. In case of (k,n)-threshold secret sharing scheme, any k out of n shares can decrypt secret although any k−1 or less shares do not leak out any information of the secret. Thus, it is possible to reconstruct secret even if up to n−k storage are unavailable. The present disclosure combines secret sharing, more precisely, ramp threshold secret sharing and systematic erasure coding. In order to improve the storage efficiency of secret sharing schemes, ramp secret sharing schemes (ramp schemes) may be employed, which have a tradeoff between security and storage efficiency. The price for increase in storage efficiency is partial leakage of information about relations between parts of secret, e.g. value for a linear combination of several parts of the secret.

Storage efficiency is computed as amount of original data (secret) divided by the total amount of stored data. Storage efficiency of classical secret sharing scheme is equal to 1/n. Storage efficiency of ramp threshold scheme varies between 1/n and k/n depending on the amount of introduced supplementary inputs. The highest storage efficiency k/n is achieved when ramp threshold scheme reduces to information dispersal algorithm. Considered security techniques are based on error-correction codes, more precisely, linear block error-correction codes. The present disclosure makes use of maximum distance separable codes (MDS).

FIG. 1 is a schematic block diagram illustrating a distributed storage system interacting with client applications, in accordance with the present application. Original data 103, e.g., files, produced by client applications 102, are distributed over a set of storage nodes 106, and original data 103 is available to client applications 102 upon request. Any system producing and receiving data on the client side can be considered as an instance of a client application 102. Further, data processing and transmission control are arranged by processing system 101, located on the client side or in the cloud. Processing system 101 transforms original data 103 into output chucks 104, and vice-versa. Output chucks 104 may include none, one or several frequently demanded output chunks 105 in case of original data containing frequently accessed data.

Client applications 102, processing system 101 and storage nodes 106 communicate via a data communication network, such as the Internet. Storage nodes 106 can operate independently from each other, and can be physically located in different areas. According to the present disclosure, storage nodes 106 may include none, one or several highly available and/or trusted storage nodes 107, where the number of these nodes 107 is at least equal to the number of frequently demanded output chunks 105. Here trusted storage node ensures data privacy, while probability of data leakage from untrusted storage node may be significant; highly available storage nodes demonstrate high average data transmission speed and low latency. For example, trusted storage nodes may be represented by storage nodes at client's datacenter, any other private storage and/or storage nodes with self-encrypted drives. Reliabilities of storage nodes are supposed to be comparable, i.e. probabilities of storage node failures are supposed to be similar. Processing system 101 ensures data integrity, security, protection against data loss, compression and deduplication.

Preprocessing of a Segment

Figure 2:
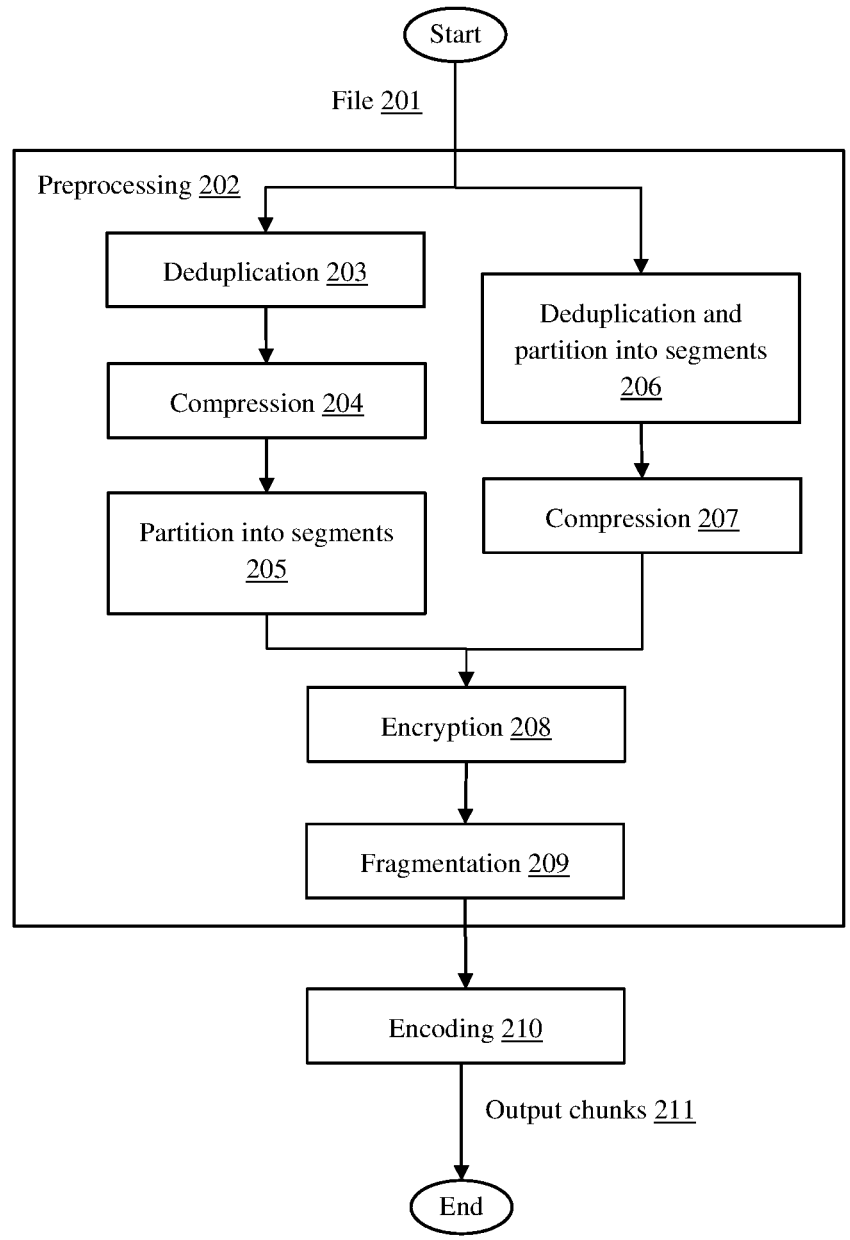
FIG. 2 is a schematic block diagram illustrating encoding of files into output chunks transferred to storage nodes.

FIG. 2 is a schematic block diagram illustrating encoding of files into output chunks transferred to storage nodes. Encoding of input file 201 consists of two stages: precoding 202 and erasure coding 210. Precoding includes none, one or several of the following optional steps: deduplication, compression, encryption and fragmentation. Optional deduplication may be performed at file-level at step 203, as well as at segment-level at step 206. In case of file-level deduplication space reduction is achieved only in case of presence of copies of whole files. In case of segment-level deduplication copies of parts of files are eliminated, so space reduction is more significant, than in case of file-level deduplication. Segment-level deduplication may be implemented for fixed-size segments or for content defined flexible-size segments. In the former case, all segments are of the same size or of several fixed sizes. This approach is easier to implement than deduplication for content defined flexible-size segments, however, small changes in files may lead to shifts of beginnings of segments, which lead to inability to detect shifted copies of file fragments. In the latter case, segments boundaries depend on the content of file, which provide opportunity to detect shifted copies of file fragments. In particular, that means that deduplication and file partition are performed simultaneously. Optional compression at step 204 or 207 may be performed after deduplication depending on the client's workload and application requirements. Compression may be either total or selective, where compression transformation is applied to a whole file or to each data segment of the file independently on file content in case of total compression. In case of selective compression, compression is applied or not depending on file/segment content, more precisely, compression transformation is applied at first to a piece of data segment, and if a reasonable degree of compression is achieved for the piece, then the compression transformation is applied to a whole data segment or a whole file. Compression is performed prior to encryption 208 in order to obtain a fair degree of compression.

In one or more implementations, optional encryption is performed at step 208 depending on client preferences, file content and storage node configuration. Encryption is computationally demanding and introduces the problem of key management. In most cases, the present disclosure ensures sufficient security level without encryption. However, files with especially high secrecy degree are encrypted. In most cases, encryption is applied to files or segments or parts of segments prior to erasure coding. However, in case of presence of one or more highly available untrusted storage nodes, encryption may be applied to highly demanded output chunks assigned to these storage nodes. An appropriate encryption option is selected depending on file access pattern. In partial file read/write operation is needed, then encryption is applied to segments or parts of segments, where size of encrypted parts depends on size of typically requested file fragments.

In one or more implementations, fragmentation is applied to a data segment at step 209 prior to erasure coding. Fragmentation is employed as a low-complexity operation, which is able to transform data into meaningless form. Erasure coding integrated with fragmentation ensures high level of uniformity, i.e. high entropy, and independence of output chunks. Here independence means that correlation between original data and output chunks is minimized, so no detectable correlation exists between them, neither between output chunks. In one or more implementations, it is also ensured that one bit change in a seed leads to significant changes in output chunks. In contrast to information dispersal algorithm (IDA), the proposed solution prevents appearance of any pattern in output data. Fragmentation may include data partitioning and encoding, wherein fragmentation encoding is a function of one or several of the following: random (pseudo-random) values, values derived from original data (e.g. derived using deterministic cryptographic hash) and predetermined values. In case of absence of encryption, fragmentation improves security level almost without sacrificing computational effectiveness.

At erasure coding step 210 each segment is transformed into a number of output chunks, which are further transferred to storage nodes. Processing of data segments is performed in individual manner. A data segment may be a part of a single file or it may be a container for several small files. Design of employed erasure coding scheme is described below in more details.

Types of Information Chunks

Figure 3:
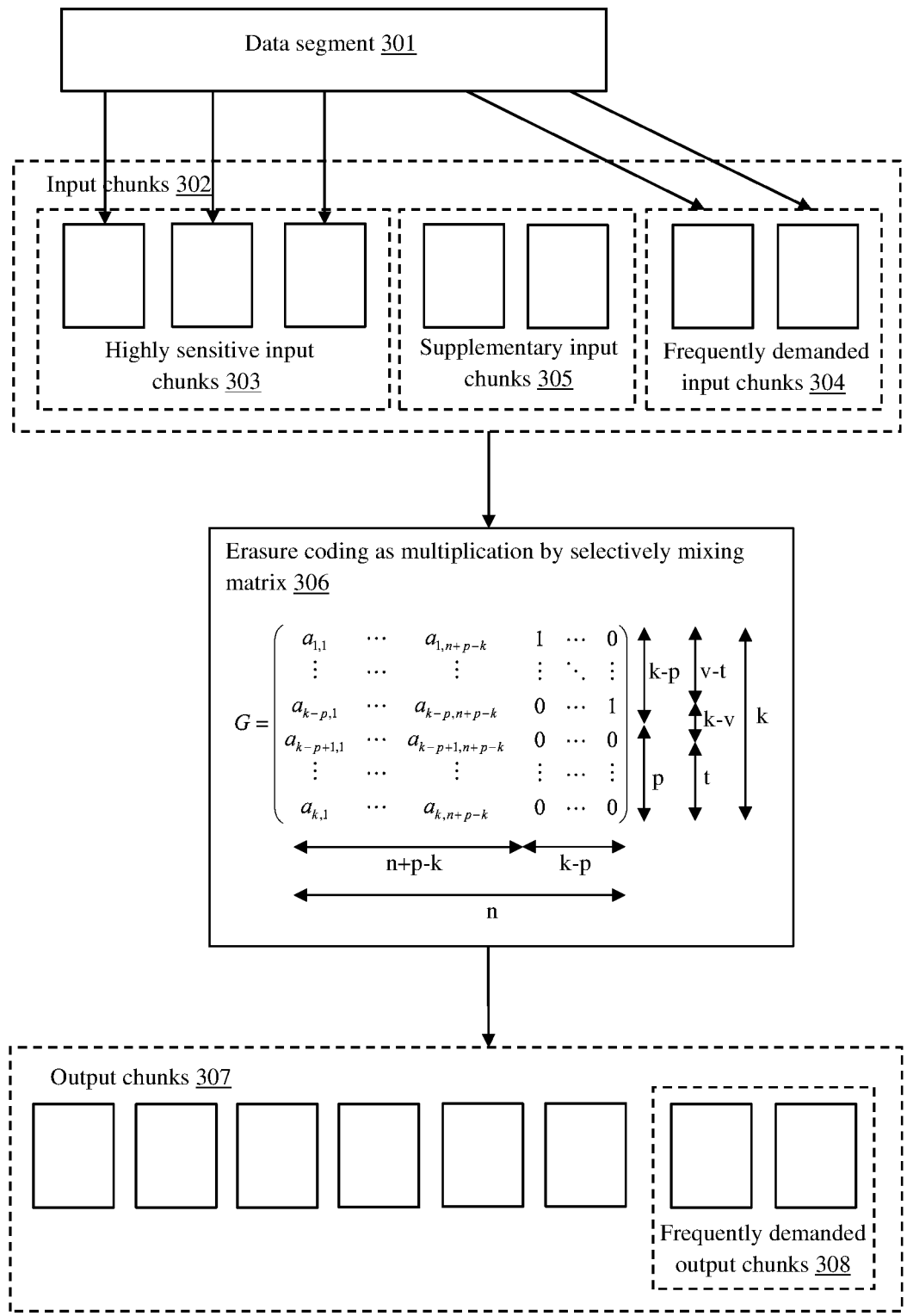
FIG. 3 illustrates flexibility of the present invention depending on structure of data being encoded.

FIG. 3 illustrates flexibility of the present disclosure depending on structure of data being encoded. Prior to actual encoding at step 306, a data segment 301 produced from one or several files is divided into v chunks and accompanied by k−v chunks containing supplementary inputs 305, where k≥v, supplementary inputs may be random, values derived from the data segment (e.g. derived using deterministic cryptographic hash) or have predetermined values. These k chunks are referred as input chunks 302 and their encoding result is referred as output chunks 307. The number of output chunks n is not less than the number of input chunks k. As in case of ramp schemes, by increasing the number of supplementary input chunks 305 one can achieve higher security level. In case of absence of supplementary input chunks 305, the proposed encoding scheme reduces to erasure coding or information dispersal. A data segment 301 may be represented by a fragment of one file, by the whole file, as well as by several individual files. In the latter case, independent access to files may be needed. According to the present disclosure, input chunks are classified as highly sensitive chunks 303 and frequently demanded chunks 304. Here highly sensitive input chunks 303 contain data which should be stored in unrecognizable manner. Highly sensitive input chunks 303 are encoded in such a way that each of them may be reconstructed only as a function of k output chunks (any k output chunks are suitable). Frequently demanded input chunk 304 are encoded in such a way that each of these chunks may be reconstructed as a copy of a related output chunk, as well as a function of any other k output chunks. Output chunks 307, except frequently demanded output chunks 308, contain only meaningless data (unrecognizable data), which means that these chunks do not contain any copy of data segment produced from client's data.

Groups of Storage Nodes

Access to at least k output chunks is usable to reconstruct any highly sensitive chunk, so these chunks are protected even in case of data leakage from any k−1 storage nodes. Probability of simultaneous data loss or data leakage from several storage nodes belonging to the same datacenter or cloud service provider is higher, than in the case of geographically remote storage nodes and maintained by different storage service providers. In one or more implementations, the number of storage nodes aloud to be located near each other or managed by the same owner is limited to be not higher than k−1. For example, this eliminates possibility of a storage service provider being able to reconstruct client's data. On the other hand, reconstruction of original data imposes an upper limit on the number of simultaneously unavailable storage nodes equal to n−k. So, in one or more implementations, the number of storage nodes aloud to be located near each other or managed by the same owner is limited to be not higher than n−k. For example, this ensures data reconstruction in case of ransomware attack on a storage service provider (cloud service provider).

Design of Erasure Coding Scheme

Figure 4:
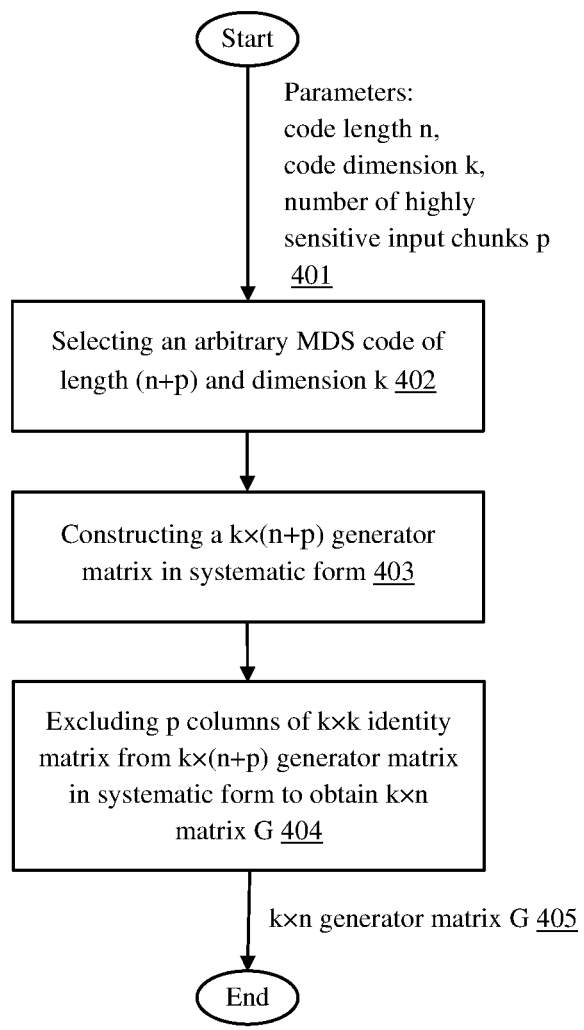
FIG. 4 illustrates design of the employed erasure coding scheme.

FIG. 4 illustrates design of the employed erasure coding scheme. The design process results in a generator matrix G 405 of a maximum distance separable (MDS) liner block error-correction code C of length n and dimension k, where dimension k is the number of input chunks being encoded and length n>k is the number of output chunks produced from k input chunks. Here sizes of input chunks and output chunks are the same. Erasure coding scheme is specified by a k×n generator matrix G (of a MDS code) comprising (k−p) columns of k×k identity matrix, where $0 \le p \le k$, while other columns form k×(n+p−k) matrix such that any its square submatrix is nonsingular. Such matrix G is further referred as selectively mixing matrix. This matrix specifies not only underlying error-correction code, but also a particular encoder. Parameter p is not lower than the number of highly sensitive input chunks, while (k−p) is not lower than the number of frequently demanded input chunks. The input parameters 401 for the erasure coding scheme design are length n and dimension k of the error-correction code and parameter p.

The process of obtaining k×n selectively mixing generator matrix G for given p is further described in more details. At first, a MDS linear block code C(parent) of length (n+p) and dimension k is selected at step 402. Any MDS code with specified parameters is suitable. Let G(parent) be a k×(n+p) generator matrix of the code C(parent). Second, generator matrix in systematic form G(parent,syst) is obtained from matrix G(parent) at step 403, where k×(n+p) matrix in systematic form is such matrix that includes k×k identity matrix as its submatrix. Indices of identity matrix columns within generator matrix G(parent,syst) are referred as systematic positions. At step 403 any k positions may be selected as systematic ones. At step 404 p among k systematic positions are selected and corresponding p columns are excluded from k×(n+p) matrix G(parent,syst), as result, k×n selectively mixing generator matrix G. Observe that code C generated by matrix G is a punctured code that matrix G generates an MDS code C. Thus, code C is a punctured code C(parent), consequently code C is also a MDS code.

In one or more implementations, Reed-Solomon code is used as a MDS code C(parent). Reed-Solomon codes are widely used to correct errors in many systems including storage devices (e.g. tape, Compact Disk, DVD, barcodes, etc.), wireless or mobile communications (including cellular telephones, microwave links, etc.), satellite communications, digital television/DVB, high-speed modems such as ADSL, xDSL, etc. It is possible to construct a Reed-Solomon code for any given length and dimension. There are several ways to perform encoding with Reed-Solomon code, e.g. polynomial representation or vector-matrix representation may be employed. In the latter case Reed-Solomon code may be generated by Cauchy matrix concatenated with identity matrix or by Vandermonde matrix. In one or more implementations, k×n generator matrix G for erasure coding is derived from k×(n+p) Vandermonde matrix. In one or more implementations, k×n generator matrix G for erasure coding is derived from k×(n+p−k) Cauchy matrix concatenated with k×k identity matrix.

Data Encoding

FIG. 3 shows a flow diagram of steps executed for erasure encoding of a data segment. Here a data segment 301 is already preprocessed, i.e. deduplication, compression, encryption and/or fragmentation are already applied, if necessary. Preprocessed data segment 301 is divided into $v \le k$ input chunks 302, comprising t highly sensitive chunks 303 and v−t frequently demanded chunks 304, $0 \le t \le v$. Value of t is selected depending on the segment structure and the number of untrusted storage nodes. k−v supplementary input chunks 305 are generated to accompany input chunks produced from data segment, supplementary inputs may be random, values derived from original data (e.g. derived using deterministic hash) or have predetermined values. Input chunks are ordered in such a way that their encoding 306 results in k−p output chunks on systematic positions being equal to v−t frequently demanded input chunks 304 and k−p−(v−t) supplementary input chunks 305. In order to reduce computational complexity of encoding, p=t is selected, which maximizes the number of systematic positions. Encoding with k×n generator matrix G results in n output chunks 307. Input chunks and output chunks have the same size. During encoding 306, each chuck is represented as a sequence of elements, and vector $x^{(i)}$ consisting of i'th elements of k input chunks is encoded into vector $c^{(i)}$ consisting of i'th elements of n output chunks, that is $c^{(i)} = x^{(i)} G$. Here element size is defined by the error-correction code parameters. Thus, computations for elements with different indices may be performed in parallel, e.g., using vectorization.

Mapping Output Chunks to Storage Nodes

Generated output chunks are assigned storage nodes and then transferred to them. Frequently demanded output chunks are assigned to highly available and/or trusted storage nodes, while other output chunks are assigned to untrusted storage nodes. Output chunks produced from the same segment, except frequently demanded output chunks, are considered to be equally important and treated evenly. So, these chunks may be mapped to untrusted storage nodes using any approach, e.g. depending on their index or randomly.

In one or more implementations, frequently demanded output chunks are also treated evenly and mapped to highly available and/or trusted storage nodes depending on their index or randomly. However, knowledge of content/structure of frequently demanded output chunks may be employed to optimize storage node assigning. For example, an output chunk comprising a number of frequently accessed small files may be assigned to the most available trusted storage node, i.e. storage node with the highest average data transferring speed and low cost.

Data Reconstruction

A client is allowed to request a file, a data segment or its part. Several data reconstruction scenarios are possible. A whole segment may be reconstructed from any k output chunks received from storage nodes. Requested part of a data segment may be reconstructed from corresponding parts of any k output chunks, where these corresponding parts have the same boundaries (i.e. range of indices) within output chunks. If the requested part of a data segment is contained in one or more frequently demanded input chunks, then it is sufficient to download only these corresponding output chunks from storage nodes (i.e. download the same amount as requested). Thus, low traffic is demonstrated in case of processing requests for frequently demanded input chunks.

Output chunks stored at untrusted storage nodes are of the same significance for data reconstruction. Chunks to download are selected depending on available network bandwidth, more precisely, predicted latency for transferring data from corresponding storage node to the client's side. In case of output chunks of large size, the present disclosure provide opportunity to achieve lower latency by downloading parts of more than k output chuck and reconstructing data segment from them. The total size of these downloaded parts is at least the same as the size of output chunk multiplied by k, and the number of downloaded bytes with the same index within output chunks is at least k.

Figure 5:
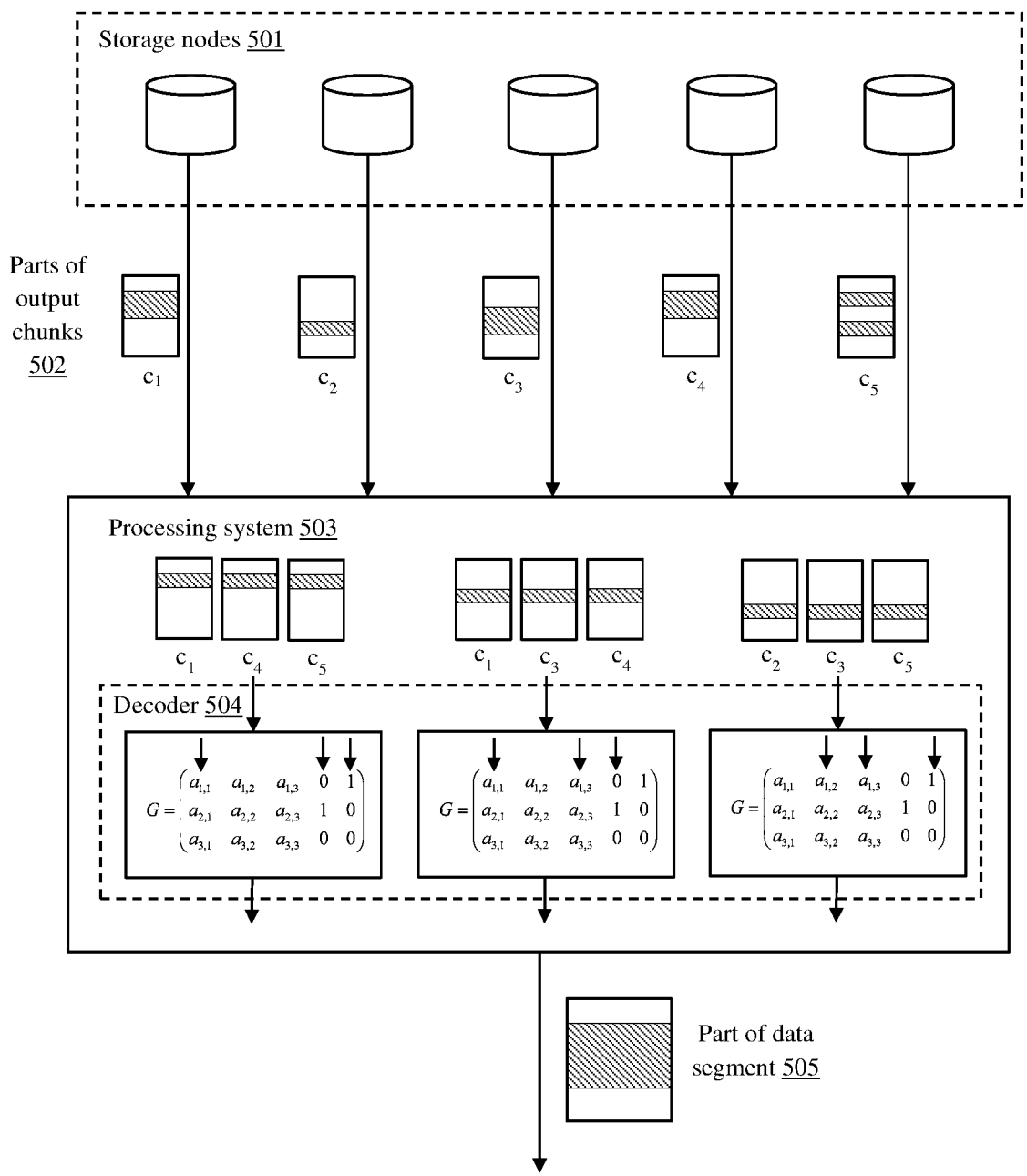
FIG. 5 illustrates an example of reconstruction of a part of a data segment from parts of output chunks received from storage nodes.

FIG. 5 illustrates an example of reconstruction of a part of a data segment from parts of output chunks received from storage nodes. Reconstruction of requested data (at least a part of a data segment 505) from parts of output chunks 502 is performed as follows. First, range of indices within each input chunk corresponding to requested data is identified, where boundaries define range of indices. Second, such parts of output chunks 502 are downloaded from storage nodes 501 that the total size these parts is equal to the size of the widest range multiplied by k, and the number of parts with the same range of indices within output chunks is equal to k. Third, processing system 503 combines parts with the same range of indices into a vector cS for each set S of k source storage nodes, and then decoder 504 multiplies this vector cS by inverse matrix to matrix G(S), where G(S) is a matrix consisting of k columns of selectively mixing matrix G with indices from the set S. Thus, requested parts of information chunks are reconstructed.

Reconstruction of a frequently demanded input chunk may be performed by downloading only related output chunk, i.e. output chunk containing a copy of this input chunk. Alternatively, a frequently demanded input chunk may be reconstructed from any k output chunks. The latter approach is used, when storage node containing related output chunk is unavailable or data transmission speed is too low.

Observe that typically data encoding methods for distributed storage systems with untrusted storage nodes support only whole segment reconstruction because of mandatory encryption for segments. In contrast, the present disclosure enables reconstruction of any part of a segment, since employed encoding scheme ensures security without encryption. This became possible also because cloud service providers started to provide opportunity to perform partial object retrieval.

Verification

Intentional or eventual data corruptions at storage service provider side are possible. Thus, an output chunk received from a storage node may differ from an output chunk initially transferred to this storage node. Undetected changes in output chunk lead to errors during segment reconstruction process. According to the present disclosure, hash-generated signatures are exploited in order to check integrity of each output chunk in a timely manner. Each output chunk is supplied with two signatures: visible and hidden signatures, where visible signature may be checked prior to downloading data chunk from storage node and hidden signature is checked after data segment reconstruction from a number of output chunks. Visible signature helps to detect incorrect or erroneous data (e.g. lost or damaged data) on the cloud service provider side. Visible signature is generated individually for a particular output chunk, and it depends only on content of this chunk. Rigorous monitoring of stored data is performed in order to reveal any inconsistency in the first place. Hidden signature is generated based on a whole segment, and it matches with reconstructed segment only if all output chunks are correct. So, hidden signature enables one to detect skillfully replaced output chunk even when check on visible signature was successfully passed, e.g. in case of data replacement by a malicious cloud service provider or as result of intruder attack. In one or more implementations, homomorphic hash functions are used to compute signatures. Homomorphic hash function allows one express hash (signature) for a data block given by a linear combination of several data blocks via hashes of data blocks participating in this combination.

In addition to the features shown and described herein, the present disclosure includes an erasure coding method for distributed storage systems, which ensures high storage efficiency and low repair bandwidth in case of storage node failure. The proposed erasure coding scheme may be considered as an instance of minimum-storage regenerating (MSR) regenerating code. Thus, storage efficiency is the same as in case of any maximum distance separable (MDS) code, e.g. Reed-Solomon code. Observe that in case of Reed-Solomon codes, amount of encoded data usable to repair a single storage node failure is equal to the total size of original data, that is network traffic is high during repair operation. The erasure coding scheme of the present disclosure is optimized to achieve low repair bandwidth in case of a single storage node failure, where repair bandwidth is measured as the amount of data transferred to repair data contained within failed storage nodes divided by amount of encoded data stored within these failed storage nodes. Low repair bandwidth is provided for both systematic and parity encoded chunks of data. The present disclosure in average provides 2-times reduction of repair bandwidth compared to Reed-Solomon codes. At the same time, the present disclosure demonstrates the same erasure recovering capability as MDS codes, e.g. Reed-Solomon codes.

Distributed Storage System

Figure 6:
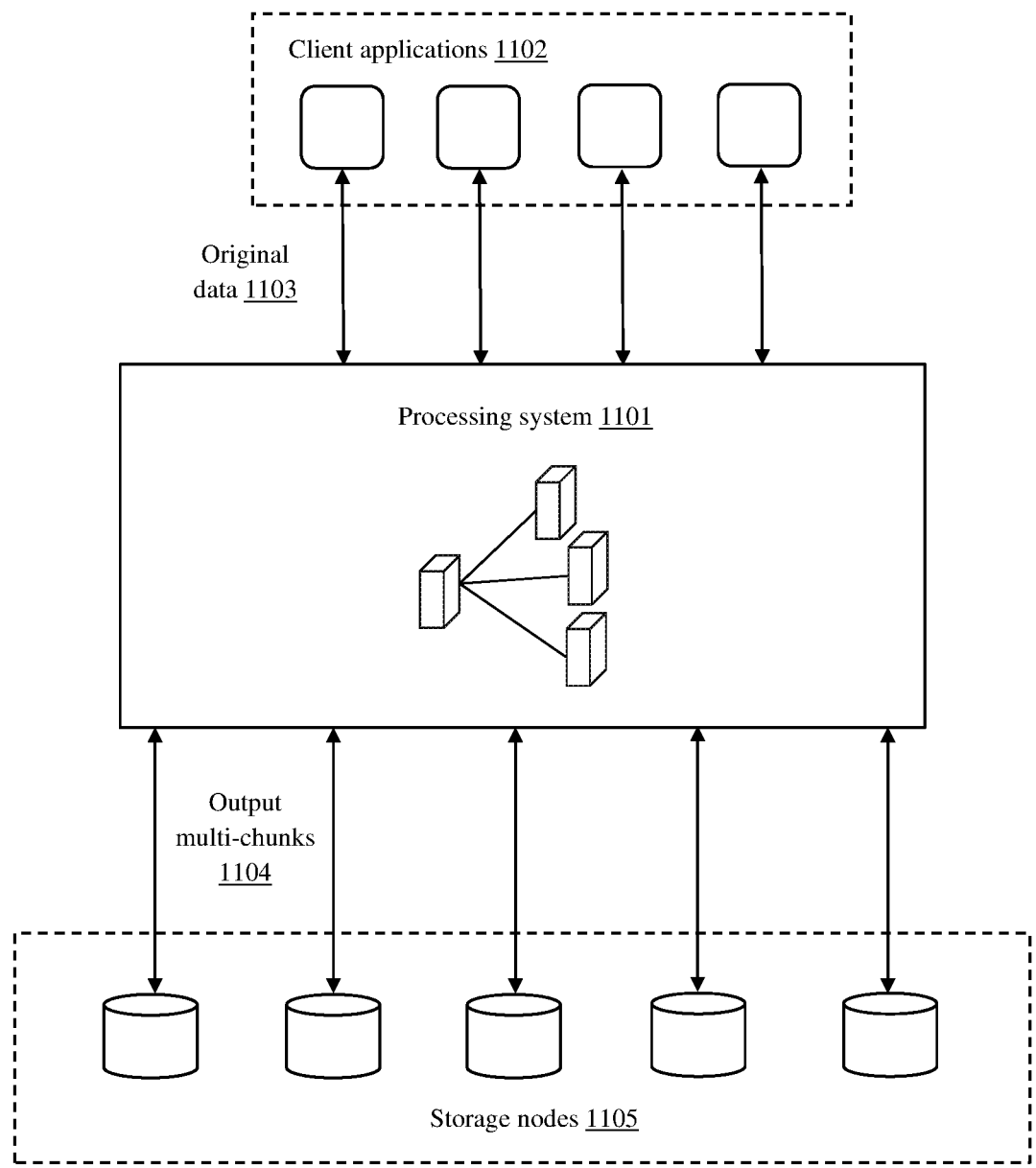
FIG. 6 is a schematic block diagram illustrating a distributed storage system interacting with client applications, in accordance with the present application.

FIG. 6 is a schematic block diagram illustrating a distributed storage system interacting with client applications, in accordance with the present application. Original data 1103, e.g., files, produced by client applications 1102, are distributed over a set of storage nodes 1105, and original data 103 is available to client applications 1102 upon request. Any system producing and receiving data on the client side can be considered as an instance of a client application 1102. Further, data processing and transmission control are arranged by processing system 1101, located on the client side or in the cloud. Processing system 1101 transforms original data 1103 into output multi-chucks 1104, and vice-versa.

Client applications 1102, processing system 1101 and storage nodes 1105 communicate via a data communication network, such as the Internet. Storage nodes 1105 can operate independently from each other, and can be physically located in different areas. Reliabilities of storage nodes are supposed to be comparable, i.e. probabilities of storage node failures are supposed to be similar. Processing system 1101 ensures data integrity, protection against data loss, and optionally security, compression and deduplication. Protection against data loss, caused by storage node failures (e.g., commodity hardware failures), is provided by erasure coding. Moreover, erasure coding helps to tolerate storage node outages, while high storage efficiency is provided by selected construction of error-correction code, such as shown and described in greater detail herein. Data security is optionally arranged by means of data mixing and dispersing among different locations. Storage efficiency is may be enhanced by deduplication. Furthermore, deduplication can be performed for not just files, but also for small pieces of files, an appropriate tradeoff between deduplication complexity and storage efficiency, which can be selectable by a client. Further, optional compression can be applied to data, depending on respective client preferences. The present disclosure includes an erasure coding method minimizing network traffic induced by storage node repair operation, i.e. recovering of data stored at a single failed storage node. Minimization of network traffic leads to the smallest latency and the fastest data recovery.

General Design of Erasure Coding Scheme

Figure 7:
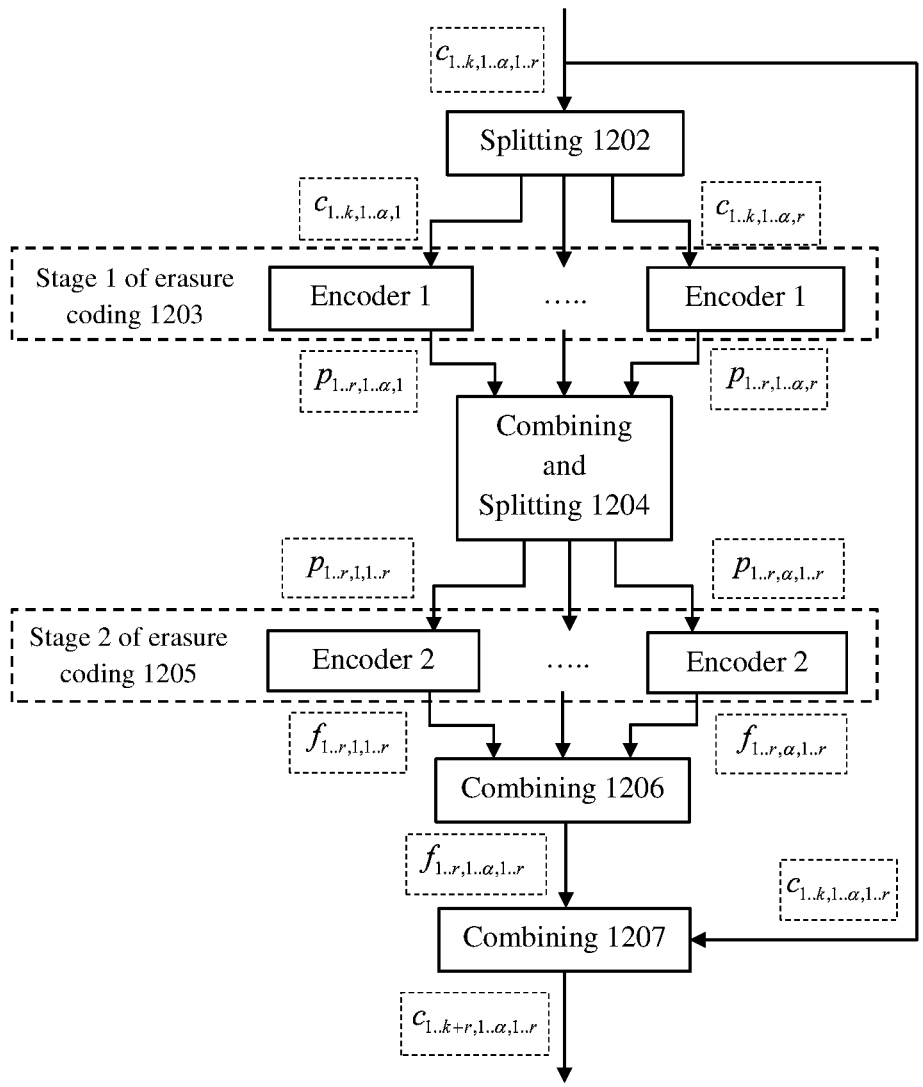
FIG. 7 is a block-diagram illustrating general design of the erasure coding scheme.
Figure 11:
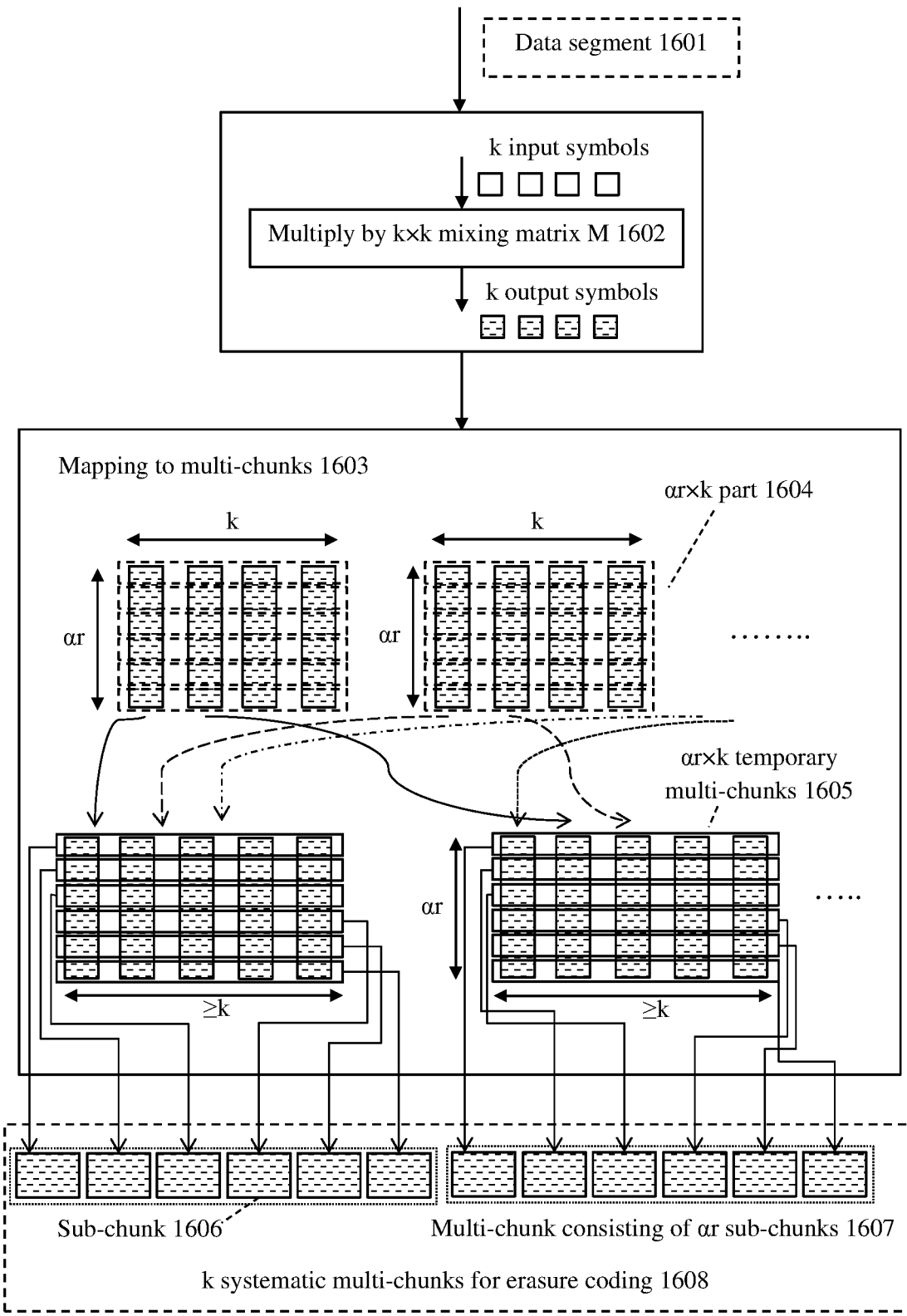
FIG. 11 shows an example of data mixing scheme, which may be optionally applied prior to erasure coding.

FIG. 7 is a block-diagram illustrating general design of the erasure coding scheme. At first input data segment is divided into k parts of equal size, referred as information multi-chunks, where k is the number of storage nodes which should be accessed in order to reconstruct original data, wherein total amount of data transferred from these k storage nodes is equal to the segment size. Data security may be optionally arranged by means of data mixing and subsequent dispersal among different locations. Processing of information multi-chunks using data mixing is described below (FIG. 11). Input multi-chunks for erasure coding are referred as systematic multi-chunks, where systematic multi-chunks may be the same as information multi-chunks or be a function of information multi-chunks as in case of data mixing.

Let us represent k systematic multi-chunks as k columns of a table, wherein $\alpha$ rows are distinguished in the table and each row is further divided into r sub-rows, where r is such that the total number of storage nodes is equal to r+k and $\alpha$ is a parameter defined by the stage 1 of erasure coding 1203. An element in a row/column intersection is referred as chunk and an element in a sub-row/column intersection is referred as sub-chunk. The following notation is used: $c_{g,i,j}$ for an element (sub-chunk) located in g-th column and j-th sub-row of i-th row, and $c_{a\ldots b,c\ldots d,e\ldots f}$ for a sub-table consisting of columns {e, . . . , f} and sub-rows {a, . . . , b} of rows {c, . . . , d}.

Output of the encoding scheme at FIG. 7 is represented by $\alpha r \times (k+r)$ table $c_{1\ldots k+r,1\ldots\alpha,1\ldots r}$, which comprises input data table $c_{1\ldots k,1\ldots\alpha,1\ldots r}$ and computed parity data table $c_{k+1\ldots k+r,1\ldots\alpha,1\ldots r}$, i.e. output is given by k systematic multi-chunks and r parity multi-chunks. Output (systematic and parity) multi-chunks may be assigned to storage nodes using an arbitrary method. In particular, a storage node may contain systematic and parity multi-chunks produced from different data segments. Storage efficiency is equal to k/(k+r), i.e. the same as in case of maximum distance separable codes, e.g. Reed-Solomon codes. In other words, the present disclosure provides the best possible storage efficiency for given values of parameters k and r.

According to the present disclosure, the erasure coding scheme satisfies the following requirements:

1. Original data may be reconstructed as a function of encoded data stored at any k out of (k+r) storage nodes, where size of original data is equal to the total size of encoded data stored at k storage nodes.
2. Repair of i-th parity multi-chunk requires accessing 1/r portion of each of other k+r−1 output multi-chunk produced from the same segment. Repair bandwidth for i-th parity multi-chunk is given by (k+r−1)/r.
3. Repair of i-th systematic multi-chunk requires accessing 1/r portion of each of other k+r−1 output multi-chunk produced from the same segment in case sufficiently high value of parameter $\alpha$, otherwise $\tau_i$ supplementary sub-chunks are also accessed. Repair bandwidth for i-th systematic multi-chunk is given by $(k+r-1)/r+\tau_i/\alpha$.

From coding theory perspective, the first requirement means that employed error-correcting code demonstrate the same property as maximum distance separable (MDS) codes. Thus, the first requirement is further referred as MDS requirement. The second requirement means the smallest possible repair bandwidth, i.e. amount of data transferred during recovering of data stored in failed storage node is minimized. Observe that repair bandwidth in case of a Reed-Solomon code is equal to k.

These requirements for erasure coding scheme are satisfied as follows. Erasure coding is performed in two stages. At step 1202 data is split into r sub-tables $c_{1\ldots k,1\ldots\alpha,j}$, $1 \le j \le r$. At step 1203 each of these sub-tables is independently encoded: encoder of the stage 1 independently compute a parity sub table $p_{1\ldots r,1\ldots\alpha,j}$ for each data sub-table $c_{1\ldots k,1\ldots\alpha,j}$, $1 \le j \le r$. Elements (sub-chunks) of $p_{1\ldots r,1\ldots\alpha,j}$ are further referred as intermediate parity elements (sub-chunks). Encoder for stage 1 is such that 1. k input systematic multi-chunks may be reconstructed from any k out of k+r systematic and intermediate parity multi-chunks, i.e. MDS requirement is satisfied after stage 1 of erasure coding;
2. Any systematic multi-chunk may be reconstructed with repair bandwidth $(k+r-1)/r+\tau_i/\alpha$, wherein 1/r portion of each of other k+r−1 multi-chunk is transferred from storage nodes together with $\tau_i$ supplementary sub-chunks, and wherein either all or none intermediate parity sub-chunks in a sub-row are usable.

At step 1204 the obtained intermediate parity sub-chunks are combined and then split into r×r sub-tables $p_{1\ldots r,i,1\ldots r}$, $1 \le i \le r$. At step 1205 each r×r sub-table $p_{1\ldots r,i,1\ldots r}$ is independently transformed by encoders of the stage 2 into r×r sub-table $f_{1\ldots r,i,1\ldots r}$, $1 \le i \le r$. Elements (sub-chunks) of $f_{1\ldots r,i,1\ldots r}$ are further referred as parity elements (sub-chunks). At step 1206 obtained parity sub-chunks are combined into a sub-table $f_{1\ldots r,1\ldots\alpha,1\ldots r}$ containing r parity multi-chunks. Then at step 1207 these r parity multi-chunks $f_{1\ldots r,1\ldots\alpha,1\ldots r}$ are combined with k systematic multi-chunks $c_{1\ldots k,1\ldots\alpha,1\ldots r}$ to obtain usable $c_{1\ldots k+r,1\ldots\alpha,1\ldots r}$. Multi-chunks $c_{g,1\ldots\alpha,1\ldots r}$, $1 \le g \le k+r$, are further transferred to k+r independent storage nodes.

Encoder for the stage 2 is such that 1. k systematic multi-chunks may be reconstructed from any k out of (k+r) systematic and parity multi-chunks, that is replacement of r intermediate parity multi-chunks by r parity multi-chunks does not affect compliance with the MDS requirement;
2. Any parity multi-chunk may be recovered with repair bandwidth (k+r−1)/r, wherein 1/r portion of each of other k+r−1 multi-chunk is transferred from storage nodes.

The first requirement means that MDS property ensured by the encoders of stage 1 for k systematic multi-chunks and r intermediate parity chunks is hold after applying encoders of stage 2 for k systematic multi-chunks and r parity multi-chunks.

Observe that i-th chunks of intermediate parity multi-chunk are transformed into i-th chunks of parity multi-chunks independently for different i, $1 \le i \le \alpha$. This ensures that repair of a systematic storage node may be performed for systematic multi-chunks combined with parity multi-chunks in the same way as for systematic multi-chunks combined with intermediate parity multi-chunks.

Figure 8:
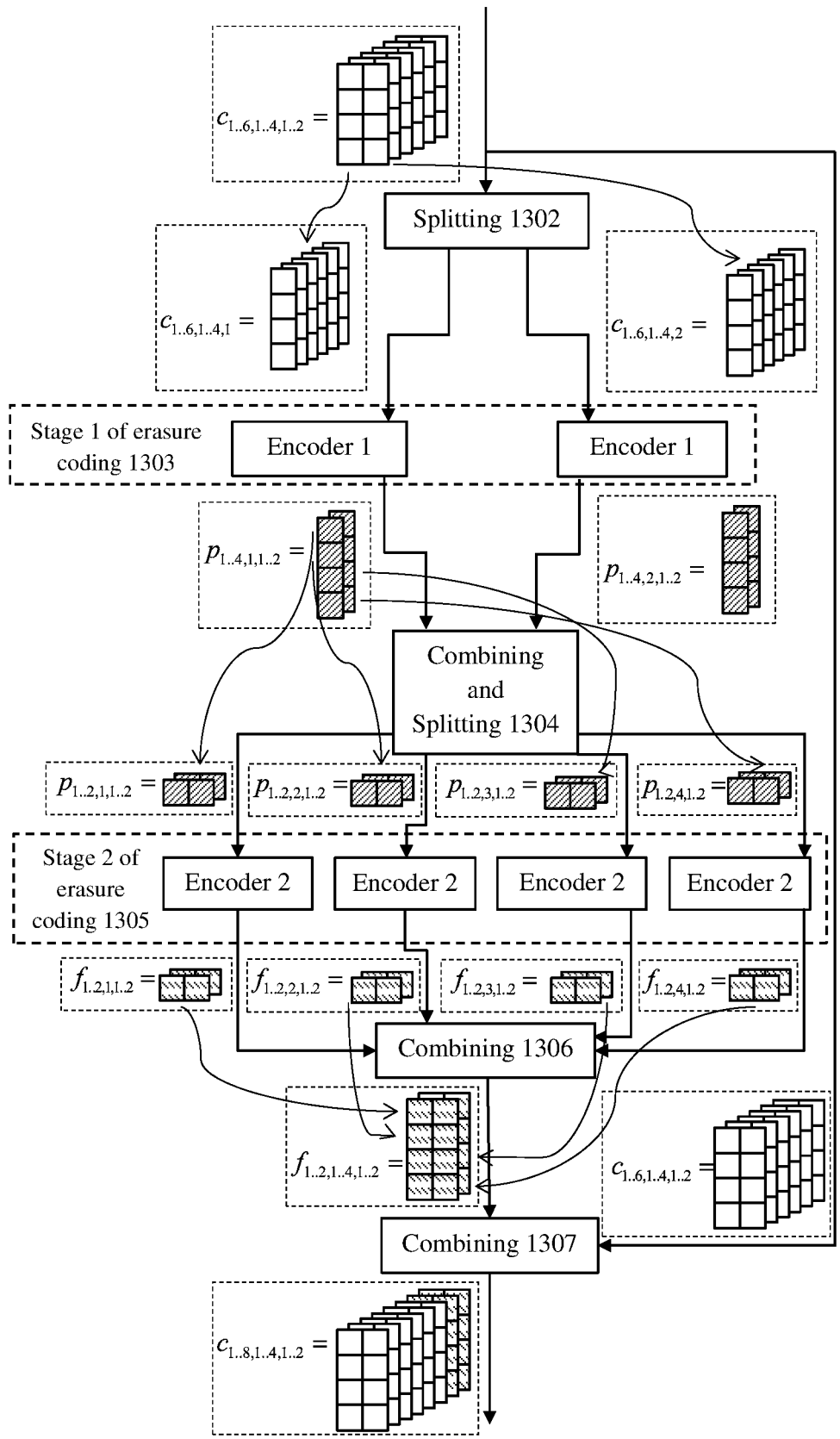
FIG. 8 shows an example of data splitting and combining steps in accordance with the erasure coding scheme.

FIG. 8 shows an example of data splitting and combining steps in accordance with the erasure coding scheme. Encoding of a data segment for a particular set of parameters: k=6, α=4 and r=2, is considered. So, an input segment of data is represented as 6×4×2 array $c_{1\ldots6,1\ldots4,1\ldots2}$. Each multi-chunk $c_{i,1\ldots4,1\ldots2}$ is represented as a rectangular, which consists of squares representing sub-chunks. Thus, at step 1302 each multi-chunk is split into r=2 parts, where each part consists of α=4 sub-chunks. Output of stage 1 of erasure coding 1303, i.e. intermediate parity sub-chunks, is represented by shaded squares. At step 1304 these sub-chunks are combined into intermediate parity multi-chunks, and then split into chunks for stage 2 of erasure coding 1305, where each chunk consists of r=2 sub-chunks. At steps 1306 and 1307 obtained encoded data is combined to obtain r=2 parity and k=6 systematic multi-chunks, which are further transferred to k+r=8 storage nodes.

Encoding Scheme for the First Stage

Figure 9:
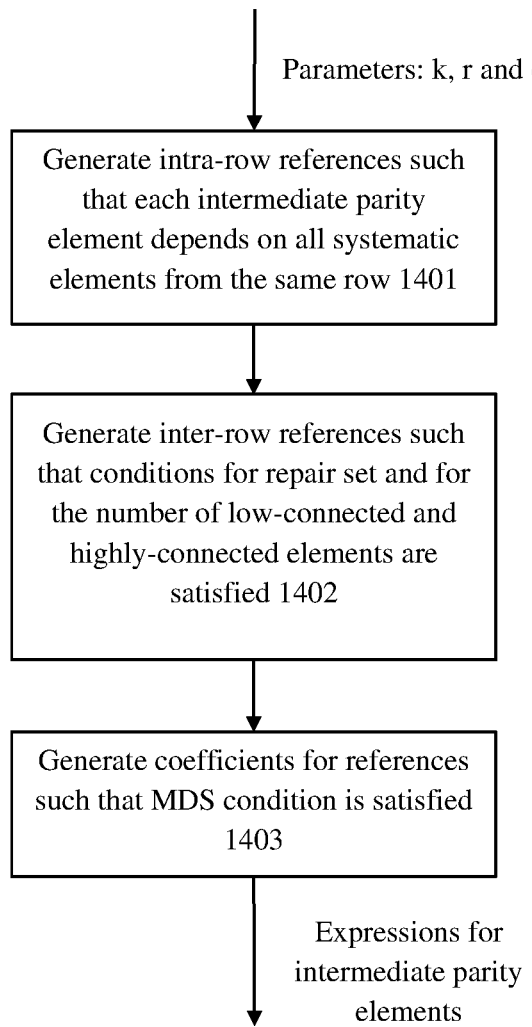
FIG. 9 is a block-diagram illustrating design of encoder for the first stage of erasure coding.

FIG. 9 is a block-diagram illustrating design of encoder for the first stage of erasure coding. Encoder of the stage 1 operates over data represented as tables. The encoder takes as input a table consisting of α rows and k columns and computes a table consisting of α rows and r columns. Here it is assumed that α is divisible by r. Elements of input α×k table are referred as systematic elements, while elements of output α×r table are referred as intermediate parity elements. Systematic elements contain original data, while each intermediate parity element is a function of systematic elements. Here each element is given by one or several symbols from Galois field. For example, an element may be represented by chunk or sub-chunk consisting of symbols from Galois field. The encoder is specified by α×r expressions, where each expression is intended for computation of a particular intermediate parity element as a linear combination of systematic elements. Presence of a systematic element with non-zero coefficient in expression for an intermediate parity element is denoted as reference between these elements. Design process comprises two steps (1401 and 1402) related to generation of references between elements and step 1403 related to generation of appropriate coefficients for these references.

At step 1401 intra-row references are generated such that each intermediate parity element has references to all k systematic elements from the same row. That is each intermediate parity element is a function of at least k systematic elements from the same row. At step 1402 such additional inter-row references are generated for r−1 columns of intermediate parity elements that the following conditions are satisfied:

1. Each systematic element has at most one inter-row reference, wherein systematic elements with inter-row references are referred as highly-connected and systematic elements without inter-row references are referred as low-connected;
2. Each intermediate parity element has none, $\lfloor k/r \rfloor$ or $\lceil k/r \rceil$ references;
3. Each systematic column has α/r low-connected elements. A set of row-indices of α/r low-connected elements from the i-th systematic column is referred as repair set $W^{(i)}$, 1≤i≤k;
4. Each systematic column has α−α/r highly connected elements;
5. References of α−α/r highly connected elements of i-th systematic column point to α−α/r different intermediate parity elements belonging to rows from repair set $W^{(i)}$ and the smallest possible number $\tau_i$ of elements from other rows, 1≤i≤k;
6. Each row has $\lfloor k/r \rfloor$ or $\lceil k/r \rceil$ low-connected element.

Thus, expression for each intermediate parity element includes k, k+$\lfloor k/r \rfloor$ or k+$\lceil k/r \rceil$ systematic elements. The specified requirements for references enables recovering of elements of i-th systematic column from rows belonging to repair set $W^{(i)}$ and $\tau_i$ elements from other rows, 1≤i≤k. According to one implementation, the following objective function is minimized in 5-th requirement:

$$f(\tau) = \frac{1}{k}\sum_{i=1}^{k}\tau_i.$$

For sufficiently high α it is possible to achieve f(τ)=0, in this case it is sufficient to transfer 1/r portion of each of other k+r−1 columns for repair of any systematic column stored on a failed SN, i.e. repair bandwidth is equal to (k+r−1)/r. In case of f(τ)>0, repair bandwidth for i-th systematic column is (k+r−1)/r+$\tau_i$/α, and the average repair bandwidth for systematic column is (k+r−1)/r+f(τ)/α. So, minimization of average number of supplementary elements f(τ) leads to minimization of repair bandwidth.

At step 1403 coefficients for references are generated such that MDS condition is satisfied. That is elements of any column may be recovered from elements of any k other columns, i.e. any element in specified column may be expressed via elements of any k pre-selected columns.

Encoding Scheme for the Second Stage

Figure 10:
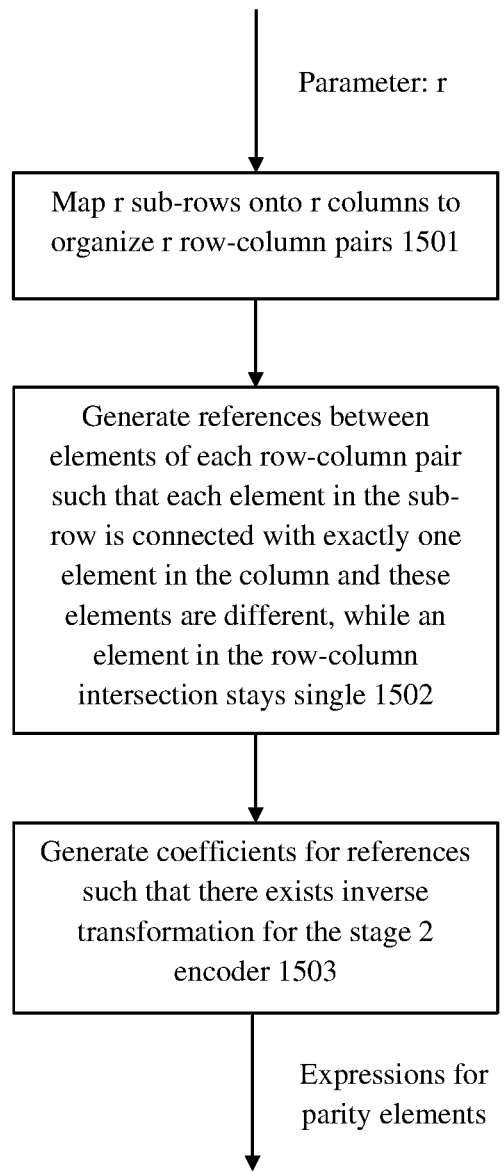
FIG. 10 is a block-diagram illustrating design of encoder for the second stage of erasure coding.

FIG. 10 is a block-diagram illustrating design of encoder for the second stage of erasure coding. Encoder of the stage 2 operates over data also represented as tables. In a view of two-level encoding, these tables are referred as sub-tables consisting of columns and sub-rows. The encoder takes as input a sub-table consisting of r sub-rows and r columns and computes a sub-table also consisting of r sub-rows and r columns. Elements of input r×r sub-table are referred as intermediate parity elements (e.g. sub-chunks), while elements of output r×r sub-table are referred as parity elements. Intermediate parity elements contain output from the 1 stage encoder, while each parity element is a function of intermediate parity elements. At step 1501 a set of r sub-rows is mapped onto a set of r parity columns, thus for each parity index (column) there is a related sub-row. At step 1502 references between elements of each row-column pair are generated such that each elements in the sub-row is connected to exactly one element in the column and these elements are different, while element in the row-column intersection stays single. According to generated references, expressions for r(r−1) parity elements are given by linear combinations of two intermediate parity elements, while expressions for r parity elements are given by single intermediate parity elements. At step 1503 such coefficients are generated for each parity element expression that there exists an inverse transformation for the stage 2 encoding.

After the second encoding stage parity elements satisfy the following conditions:

Each parity element located in sub-row i and column C is given by
an intermediate parity element located in sub-row i and column C, or
linear combination of two intermediate parity elements, one of which is located in sub-row i and column C and another one belongs to sub-row R and column j, where sub-row R is related to column C and j-th element of sub-row R is connected with i-th element of column C.

Each sub-row contains one parity element equal to intermediate parity element from the same sub-row and column;

Each parity column contains one parity element equal to intermediate element from the same sub-row and column;

Intermediate parity elements may be recovered from parity elements.

Erasure Coding Integrated with Data Mixing

Data mixing scheme is designed for the erasure coding scheme described above. Data is mixed in such a way that erasure coded data satisfy the following condition:

any piece of original input data may be reconstructed only from pieces of at least k erasure coded multi-chunks.

Observe that multi-chunks are stored in different storage nodes, so the above condition ensures that data is protected until a malicious adversary gains access to at least k storage nodes.

FIG. 11 shows an example of data mixing scheme, which may be optionally applied prior to erasure coding. According to one implementation, data mixing is performed as follows. A segment 1601 is divided into k parts referred as information multi-chunks. A segment 1601 is further treated as a data stream of vectors, where each vector consists of k symbols belonging to k different information multi-chunks. At step 1602 each vector consisting of k information symbols is multiplied by k×k non-singular matrix M such that its inverse matrix does not contain any zeros. Such matrix M is referred as mixing matrix. The same mixing matrix M may be used for all vectors or different matrices. Multiplication results in an output stream of vectors of the same length k. At step 1603 symbols of output data stream are mapped to k systematic multi-chunks 1608. For that output stream of vectors is divided into parts 1604, where each part 1604 consists of by $\alpha \cdot r$ vectors. Sequences of $\alpha \cdot r$ symbols with the same index within vectors are mapped to k different temporary multi-chunks 1605 in such a way that positions of sequences produces from the same part do not intersect. Symbols of i-th temporary multi-chunk 1605 are mapped to symbols of i-th systematic multi-chunk 1607, more precisely, $\alpha \cdot r$ symbols of j-th sequence of i-th temporary multi-chunk are mapped to j-th symbols of $\alpha \cdot r$ sub-chunks 1606 of i-th systematic multi-chunk, where $1 \leq i \leq k$. Produced systematic multi-chunks 1608 are further employed for erasure coding.

Repair

Figure 12:
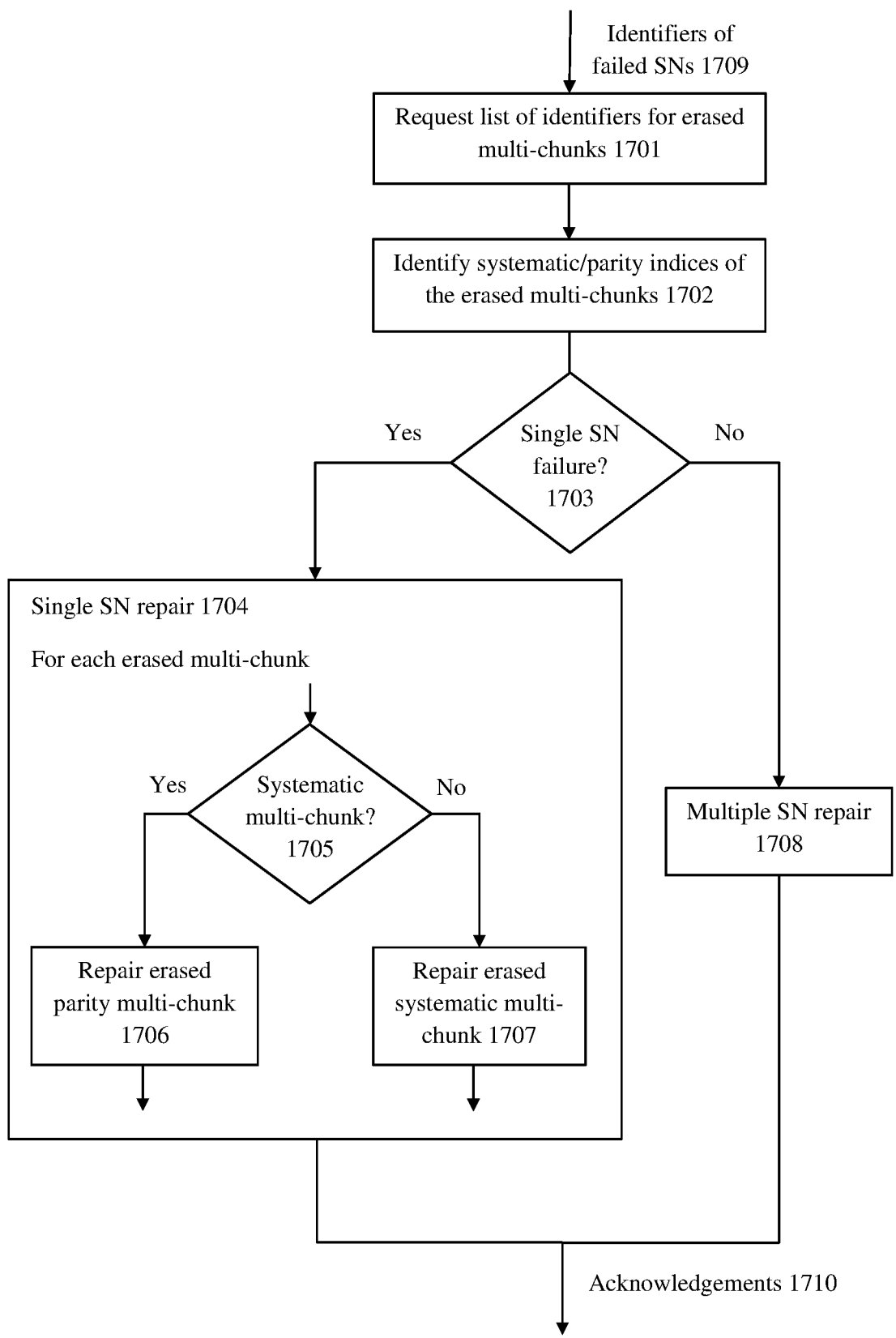
FIG. 12 is a block-diagram illustrating operation of failed storage node repair.

FIG. 12 is a block-diagram illustrating operation of failed storage node repair. Repair process includes reconstruction of data stored on failed storage nodes (SNs) and transferring of reconstructed data to new storage nodes. Failed SNs are supposed to be detected by monitoring process. Identifiers of failed SNs 1709 are input arguments for repair process. Failed SN identifiers are employed to retrieve metadata on lost multi-chunks, i.e. multi-chunks erased due to SN failure. List of identifiers of these multi-chunks is formed at step 1701, where identifiers of erased multi-chunks are further employed to retrieve data about parameters of the erasure coding scheme, systematic/parity index of erased multi-chunk and references to other multi-chunks produced from the same segment. The process of recovering of erased data includes decoding in employed error-correction code. Decoding schedule is formed depending on systematic/parity index of erased multi-chunks and parameters of the erasure coding scheme.

The present disclosure includes a low bandwidth repair method for the case of a single SN failure. This method is applied at step 1704 for recovering of each multi-chunk and it comprises two algorithms. An appropriate algorithm is selected depending on whether the erased multi-chunk is systematic one or parity (step 1705). Recovering of erased parity multi-chunk is performed at step 1706, which is further described in details by FIG. 13. Recovering of erased systematic multi-chunk is performed at step 1706, which is further described in details by FIG. 14. The number of failed SNs is checked at step 1703. If more than one storage node has failed, then multiple SN repair is performed at step 1708. Upon repair completion, acknowledgements 1710 are issued.

Recovering of a Parity Multi-Chunk in Case of a Single Storage Node Failure

Figure 13:
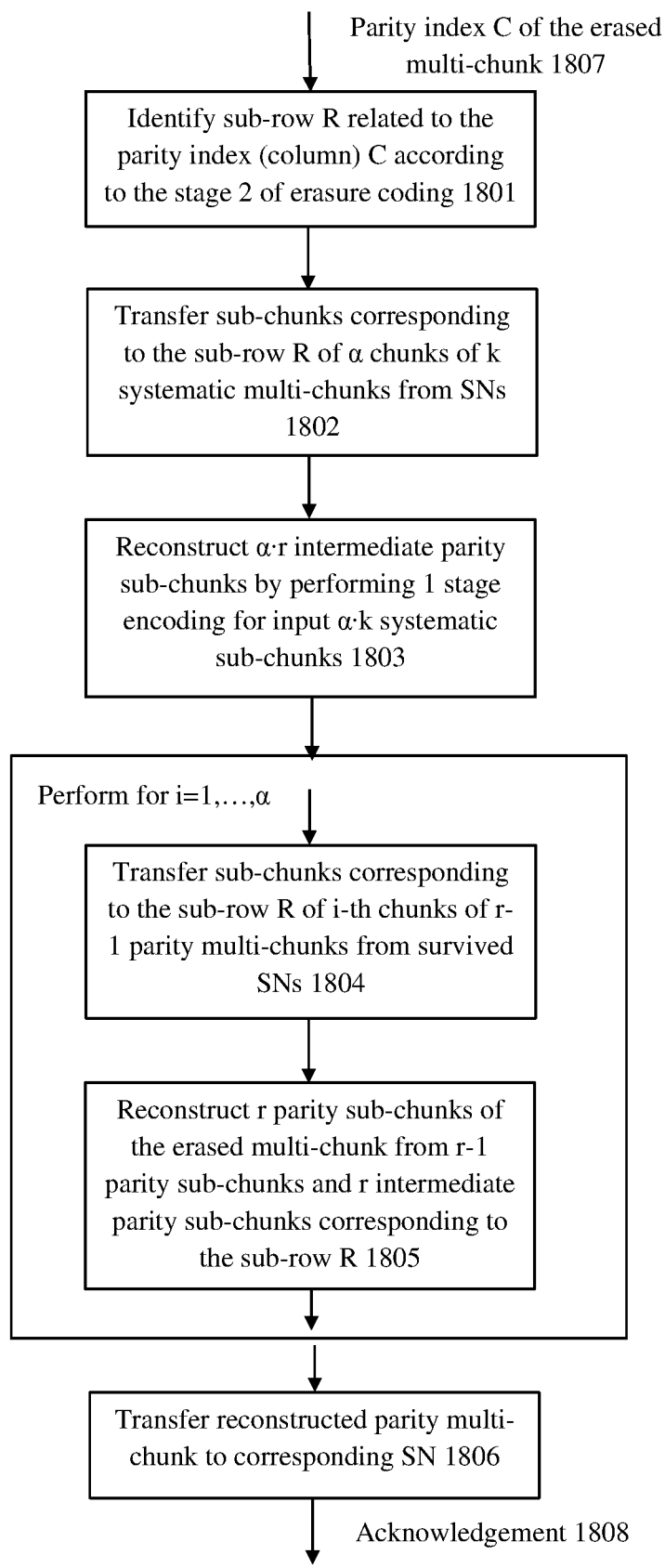
FIG. 13 is a block-diagram illustrating recovering of a parity multi-chunk in case of a single storage node failure.

FIG. 13 is a block-diagram illustrating recovering of a parity multi-chunk in case of a single storage node failure. Parity index C of erased multi-chunk 1807 is employed at step 1801 to identify row R related to the column C within the 2 stage of erasure coding scheme. Recall that each multi-chunk consists of $\alpha$ chunks and each chunk consists of r sub-chunks. At step 1802 sub-chunks corresponding to the row R of $\alpha$ chunks of k systematic multi-chunks are transferred from SNs. Thus, the total number of transferred systematic sub-chunks is equal to $\alpha \cdot k$, while the total number of stored systematic sub-chunks is $r \cdot \alpha \cdot k$. At step 1803 encoding corresponding to the stage 1 of erasure coding is performed for $\alpha \cdot k$ sub-chunks, which results in $r \cdot \alpha$ intermediate parity sub-chunks. These $r \cdot \alpha$ intermediate parity sub-chunks are further divided into $\alpha$ groups, where i-th group consists of r sub-chunks corresponding to the row R of chunks, $1 \leq i \leq \alpha$. Execution of steps 1804 and 1805 results in reconstruction of i-th chunk. These steps may be performed independently in parallel for different i, $1 \leq i \leq \alpha$. At step 1804 r-1 parity sub-chunks located in the same positions as already reconstructed intermediate parity sub-chunks for i-th chunks are transferred from survived storage nodes. At step 1805 decoding corresponding to the stage 2 of erasure coding is performed in order to recover full i-th chunk of erased multi-chunk from r intermediate parity sub-chunks and r−1 parity sub-chunks corresponding to the row R. Finally, reconstructed parity multi-chunk is transferred to the corresponding SN at step 1806. Alternatively, the multi-chunk may be transferred to the SN by chunks or sub-chunks as soon as these chunks or sub-chunks are recovered. Upon recovering and transferring of the whole reconstructed multi-chunk, an acknowledgement 1808 is send.

Recovering of a Systematic Multi-Chunk in Case of a Single Storage Node Failure

Figure 14:
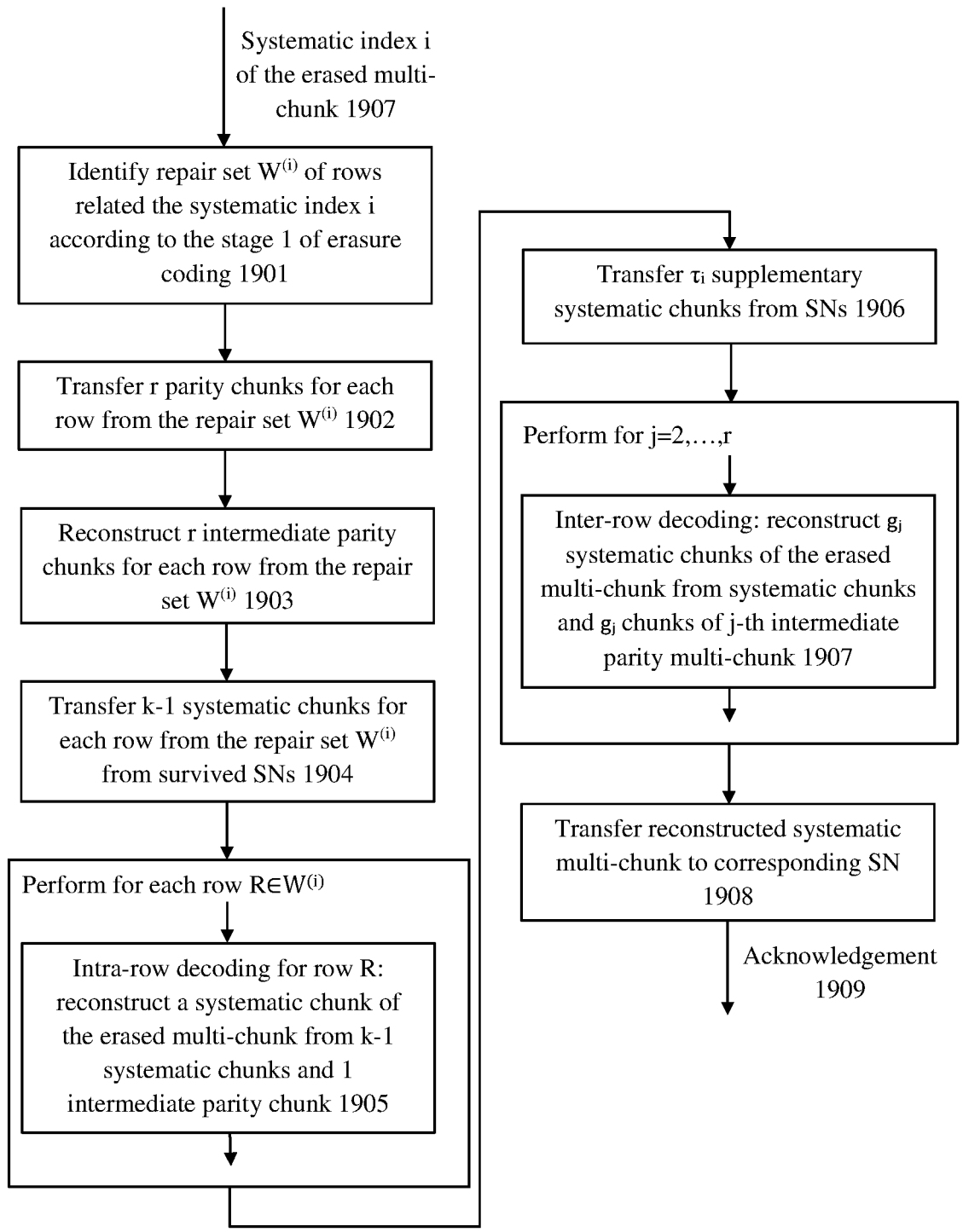
FIG. 14 is a block-diagram illustrating recovering of a systematic multi-chunk in case of a single storage node failure.

FIG. 14 is a block-diagram illustrating recovering of a systematic multi-chunk in case of a single storage node failure. Given systematic index of erased multi-chunk 1907, at step 1901 corresponding repair set W(i) consisting of $\lceil \alpha/r \rceil$ rows is identified according to the stage 1 of erasure coding.

Repair process for i-th systematic erased multi-chunk comprises two stages. At the first stage (steps 1902 and 1903) transformation inverse to the stage 2 of erasure coding is performed. At the second stage (steps 1904-1906) repair according to the stage 1 of erasure coding scheme is performed.

At step 1902 r parity chunks related to each row from the repair set W(i) are transferred from SNs. Then, at step 1903 r intermediate parity chunks are reconstructed for each row from the repair set W(i). Reconstruction is performed by applying inverse transformation for the stage 2 of erasure coding, where a system of $r \cdot r$ linear equations is solved for unknown variables represented by $r \cdot r$ intermediate parity sub-chunks. The system comprises $r(r-1)$ equations with 2 unknown variables each. In the second stage of repair process operations over $\lceil\alpha/r\rceil$. $(k-1)\cdot r$ systematic sub-chunks and $\lceil\alpha/r\rceil\cdot r\cdot r$ reconstructed intermediate parity sub-chunks are performed. At step 1904 $k-1$ systematic chunks for each row from the repair set $W(i)$ are transferred from $k-1$ survived SNs. Sub-chunks of the erased multi-chunk are further recovered in r steps, where at j-th step $g_j$ sub-chunks are recovered, $\lfloor\alpha/r\rfloor \leq g_j \leq \lceil\alpha/r\rceil$ and $g_1$ is equal to the cardinality of the repair set $W(i)$. The first step differs from other $j=2, \ldots, r$ steps. At the first $g_1$ chunks of the erased multi-chunk are recovered as result of intra-row decoding performed at step 1905, where decoding in the error-correction code of the 1 stage of erasure coding is performed. Here intra-row decoding means that decoding is independently performed for each row from the repair set $W(i)$, where decoding for a row consists in recovering of a chunk of the erased multi-chunk from $k-1$ systematic chunks and one intermediate parity chunk by solving a linear equation. Recall that each chunk consists of r sub-chunks, so operations over chunks may be represented as operations over sub-chunks performed independently in parallel.

Further steps for $j=2, \ldots, r$ employ inter-row decoding. In some cases, inter-row decoding requires $\tau_i$ supplementary systematic chunks to repair i-th multi-chunk; transferring of these chunks may be performed at step 1906 prior to decoding. Recall that for sufficiently high $\alpha$ the number of supplementary systematic chunks $\tau_i=0$. Other chunks of the erased multi-chunk are recovered by performing inter-row decoding at step 1907 for each of $j=2, \ldots, r$. At step 1907 $g_j$ intermediate parity chunks of a multi-chunk containing references to $g_j$ chunks of the erased multi-chunk are identified, where these intermediate parity chunks are from rows of the repair set $W(i)$. At j-th step chunks of the erased multi-chunk are recovered by solving a system of $g_j$ linear equations, where the equations are obtained from expressions employed for 1 stage erasure coding. Chunks of the erased multi-chunk are expressed via other chunks in these expressions. Recall that by design these expressions are such that each of them contains exactly one chunk of the erased multi-chunk and these chunks are not repeated. Finally, reconstructed systematic multi-chunk is transferred to the corresponding SN at step 1908. Alternatively, the multi-chunk may be transferred to the SN by chunks or sub-chunks as soon as these chunks or sub-chunks are recovered. Upon recovering and transferring of the whole reconstructed multi-chunk, an acknowledgement 1909 is send.

Original Data Reconstruction

Original data may be retrieved as follows. At first a list of data segments comprising original data is identified. k output multi-chunks are transferred from storage nodes for each data segment from the list, where output multi-chunks are given by systematic and parity multi-chunks. Recall, that according to the present disclosure, the employed erasure coding scheme is such that a data segment may be reconstructed from any k out of (k+r) output multi-chunks. So, any k out of (k+r) output multi-chunks may be selected for each segment. In most cases, output multi-chunks are selected to minimize average latency. Then reconstruction of each data segment is performed as a function of corresponding k output multi-chunks.

Observe that reconstruction of original data in case of Reed-Solomon codes (or any other maximum distance separable code) is performed in the same way.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A method for distributing data of a plurality of files over a plurality of respective remote storage nodes, the method comprising:
   a. splitting into segments, by at least one processor configured to execute code stored in non-transitory processor readable media, the data of the plurality of files;
   b. preprocessing each segment and then splitting it into v of input chunks: t highly sensitive chunks and v-t frequently demanded chunks, where highly sensitive chunks contain data which ought to be stored securely and highly demanded chunks contain data which ought to be stored in highly-available manner;
   c. encoding, by the at least one processor, v input chunks (produced from the same segment) together with k-v supplementary input chunks into n of output chunks, where any of n output chunks do not contain copy of any fragment of highly sensitive chunks, while v-t output chunks are given by copies of v-t frequently demanded input chunks (these output chunks are further referred as frequently demanded output chunks), $n \geq k$;
   d. assigning, by the at least one processor, output chunks to remote storage nodes, wherein n output chunks produced from the same segment are assigned to n different storage nodes;
   e. transmitting, by the at least one processor, each of the output chunks to at least one respective storage node; and
   f. retrieving, by the at least one processor, at least a part of at least one of the plurality of files by downloading parts of output chunks from storage nodes, where amount of data transferred from each storage node is optimized to minimize average latency for data reconstruction.

2. The method of claim 1, wherein the step of data splitting provides data within a respective segment that comprises a part of one individual file or several different files.

3. The method of claim 1, wherein the step of segment preprocessing comprises one or several of the following transformations: deduplication, compression, encryption and fragmentation.

4. The method of claim 3, wherein the step of segment preprocessing includes encryption, wherein one or several parts of a segment are encrypted in individual manner or a segment is encrypted entirely.

5. The method of claim 3, wherein the step of segment preprocessing includes fragmentation consisting of data partitioning and encoding, wherein fragmentation encoding is a function of one or several of the following: random (pseudo-random) values, values derived from original data (e.g. derived using deterministic cryptographic hash) and predetermined values.

6. The method of claim 1, wherein the step of encoding employs supplementary inputs given by random data, values derived from original data (e.g. derived using deterministic hash) or predetermined values.

7. The method of claim 1, wherein the step of encoding comprises applying erasure coding to k input chunks to produce n output chunks, where erasure coding is performed using a linear block error correction code in such a way that t highly sensitive input chunks may be reconstructed only as a function of at least k output chunks (any k output chunks are suitable), while (v−t) frequently demanded input chunks may be reconstructed as a copy of a related output chunks, as well as a function of any other k input chunks.

8. The method of claim 7, wherein method for erasure coding utilizes a maximum distance separable (MDS) error-correction code and encoding is performed using k×n generator matrix G comprising (k−p) columns of k×k identity matrix, where 0≤t≤p≤k and v−t≤k−p, while other columns form k×(n+p−k) matrix such that any its square submatrix is nonsingular.

9. The method of claim 1, wherein the step of assigning of output chunks to storage nodes comprises selection of highly available storage nodes, mapping frequently demanded output chunks to these storage nodes and encrypting frequently demanded output chunks in individual manner prior to transmission, where highly available storage nodes demonstrate high average data transferring speed and low latency.

10. The method of claim 9, wherein t=v, that is output chunks do not contain any copy of a fragment of input chunks produced from a segment and any fragment of the input chunks may be reconstructed only as a function of at least k output chunks.

11. The method of claim 9, wherein employed MDS error-correction code is a Reed-Solomon code.

12. The method of claim 9, wherein for encoding with Reed-Solomon code employed generator matrix is based on Vandermonde matrix.

13. The method of claim 9, wherein for encoding with Reed-Solomon code employed generator matrix is based on Cauchy matrix concatenated with identity matrix.

14. The method of claim 1, wherein the step of assigning of output chunks to storage nodes comprises selection of trusted storage nodes (e.g. in private storage) and mapping frequently demanded output chunks to these trusted storage nodes.

15. The method of claim 9, wherein a k×n MDS code generator matrix G is obtained as follows
 a. Selecting an arbitrary MDS code of length (n+p) and dimension k;
 b. Constructing a k×(n+p) generator matrix in systematic form (i.e. generator matrix, which includes k×k identity matrix as its submatrix);
 c. Excluding p columns of k×k identity matrix from k×(n+p) generator matrix in systematic form to obtain k×n matrix G.

16. The method of claim 1, wherein the step of data (at least a part of at least one of the plurality of files) retrieving comprises
 a. identifying range of indices within each information chunk corresponding to requested data;
 b. downloading, by the at least one processor, such parts of output chunks from storage nodes that
  i. total size these parts is equal to the size of the widest range multiplied by k and
  ii. the number of parts with the same range of indices within output chunks is equal to k;
 c. reconstructing, by the at least one processor, requested data by performing the following steps:
 for each set S of k source storage nodes
  i. combing parts with the same range of indices into a vector cS, and
  ii. multiplying vector cS by inverse matrix to matrix G(S), where G(S) is a matrix consisting of k columns of selectively mixing matrix G with indices from the set S.

17. A system for distributing data of a plurality of files over a plurality of respective remote storage nodes, the system comprising:
 at least one processor configured by executing instructions from non-transitory processor readable media, the at least processor configured for:
 a. splitting into segments, by at least one processor configured to execute code stored in non-transitory processor readable media, the data of the plurality of files;
 b. preprocessing each segment and then splitting it into v of input chunks: t highly sensitive chunks and v−t frequently demanded chunks, where highly sensitive chunks contain data which ought to be stored securely and highly demanded chunks contain data which ought to be stored in highly-available manner;
 c. encoding, by the at least one processor, v input chunks (produced from the same segment) together with k−v supplementary input chunks into n of output chunks, where any of n output chunks do not contain copy of any fragment of highly sensitive chunks, while v−t output chunks are given by copies of v−t frequently demanded input chunks (these output chunks are further referred as frequently demanded output chunks), n≥k;
 d. assigning, by the at least one processor, output chunks to remote storage nodes, wherein n output chunks produced from the same segment are assigned to n different storage nodes;
 e. transmitting, by the at least one processor, each of the output chunks to at least one respective storage node; and
 retrieving, by the at least one processor, at least a part of at least one of the plurality of files by downloading parts of output chunks from storage nodes, where amount of data transferred from each storage node is optimized to minimize average latency for data reconstruction.

* * * * *